United States Patent
Kino

(10) Patent No.: US 9,232,144 B2
(45) Date of Patent: Jan. 5, 2016

(54) IMAGING DEVICE, ELECTRONIC VIEWFINDER, AND DISPLAY CONTROL METHOD

(71) Applicant: Olympus Corporation, Shibuya-ku, Tokyo (JP)

(72) Inventor: Tatsuya Kino, Kodaira (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/482,054

(22) Filed: Sep. 10, 2014

(65) Prior Publication Data

US 2015/0077587 A1 Mar. 19, 2015

(30) Foreign Application Priority Data

Sep. 17, 2013 (JP) ................. 2013-192015

(51) Int. Cl.
*H04N 9/73* (2006.01)
*H04N 5/232* (2006.01)
*G09G 5/02* (2006.01)

(52) U.S. Cl.
CPC .......... *H04N 5/23293* (2013.01); *G09G 5/026* (2013.01); *H04N 9/73* (2013.01); *G09G 2320/0666* (2013.01); *G09G 2320/0673* (2013.01); *G09G 2340/06* (2013.01); *G09G 2340/14* (2013.01); *G09G 2354/00* (2013.01); *G09G 2360/144* (2013.01)

(58) Field of Classification Search
CPC .................................................. H04N 5/23293
USPC ....................................... 348/223.1; 382/167
See application file for complete search history.

(56) References Cited

U.S. PATENT DOCUMENTS 6,947,079 B2 9/2005 Parulski

FOREIGN PATENT DOCUMENTS

JP 2004-140736 5/2004

*Primary Examiner* — Joel Fosselman
(74) *Attorney, Agent, or Firm* — John C. Pokotylo; Straub & Pokotylo

(57) ABSTRACT

An imaging device of the present invention comprises a storage section for holding an initial white point of a display panel, a calculation section for calculating target white point of the display panel based on light source information for the shooting environment, a determination section for making a white point range corresponding to an adaptive light source range, and determining whether or not the initial white point or the target white point are outside the adaptive tracking range, and a display control section for carrying out controls so as to change white point of the display panel over time from the initial white point to the target white point, wherein, in the event that the initial white point or the target white point is outside the adaptive tracking range, a new initial white point or a new target white point is calculated so as to be within the adaptive range.

11 Claims, 17 Drawing Sheets

IMAGING DEVICE, ELECTRONIC VIEWFINDER, AND DISPLAY CONTROL METHOD

Benefit is claimed, under 35 U.S.C. §119, to the filing date of prior Japanese Patent Application No. 2013-192015 filed on Sep. 17, 2013. This application is expressly incorporated herein by reference. The scope of the present invention is not limited to any requirements of the specific embodiments described in the application.

BACKGROUND OF THE INVENTION

1. Field of the Invention

The present invention relates to an imaging device having an electronic viewfinder, to an electronic viewfinder for such an imaging device, and to a display control method.

2. Description of the Related Art

An imaging device fitted with an electronic viewfinder (hereafter abbreviated to "EVF") is provided. A major feature of an EVF that has appeared in imaging devices with an EVF is that it is possible to confirm a photographic image beforehand. As a result, it has been possible to satisfy a user's need to get a rough idea of image brightness and color cast.

However, in recent years there has been more demand for an EVF and the need for much easier shooting has increased, such that with an EVF it is possible to perform playback of a photographic image with greater accuracy, it is possible to carry out various image adjustments on the EVF before shooting, and it is possible to confirm an image beforehand regardless of the environment.

As well as more accurate playback of taking images, color is an extremely important factor. However, color can be subject to change for various reasons. One of these reasons is the environment in which an image is confirmed. For example, for even a single printed image, in the case of viewing under a clear sky, white will appear white, while in the case of viewing under electric lighting white will take on something of a red hue. Specifically, even if the same image is viewed, the color cast of the image the person actually perceives on viewing will differ depending on the environment in which the image is viewed.

As a factor in reproducing color, there are differences depending on color adaptation of a person's eyes. For example, even for the same image, color cast in the case of viewing immediately after entering a dark room lit with electric light, and color cast in the case of viewing after a sufficient time has elapsed after entering a dark room, appear different. This is due to what extent the eyes become accustomed or acclimatized to the environment, and shows that in actual fact the color cast a person perceives may be different.

Also, as factors for reproducing color, besides the above factors the way in which color is seen also differs depending on an adaptive range (tracking range). For example, even for the same taken image, in the case of viewing under a clear sky on the case of viewing under a cloudy sky, there will not be too big a difference in how the color cast is perceived, but in the case of viewing under a light source of comparatively strong color cast, such as an electric light, differences in color cast will be perceived. This means that simultaneously with differences in environment in which an image is confirmed, there will be differences in the color cast that is actually perceived, depending on individuals and in what light source range a person's eyes perceive white as white.

Japanese patent laid open number 2002-290979 (hereinafter referred to as patent document 1) mentions color adaptation. In this patent document 1, there is disclosure of an idea for, regarding color fogging of a taken image arising in the case of shooting in a state where a white balance of a film that is used or white balance setting of a digital camera does not conform with the light source in which the image has been shot, confirming the extent of that color fogging in-situ. With patent document 1, inverse white balance processing is applied to image data for confirmation that is displayed on a rear surface liquid crystal display, based on light source information of the light source the image has been shot in and white balance setting, taking into consideration color adaptation for the shooting environment. Also, Japanese patent laid open number 2004-140736 (hereafter referred to as patent document 2) discloses changing the display color temperature so that in a case where a user has looked away from the subject and into the EVF, the user's eyes gradually become accustomed to the EVF display.

In patent document 1 described previously, at least color adaptation is dealt with, but in a case where the color of a taken image is confirmed on a rear surface liquid crystal display, simply reflecting color adaptation in the shooting environment in the color of image data used for confirmation is insufficient, and color will also vary depending on what white point has been set for the liquid crystal display that the image is displayed on.

To give a specific example, if it is assumed that shooting light source and white balance settings match, and a confirmation image is generated so as to match the taken image, the taken image white and the confirmation image white will match. However, if that confirmation image is displayed on a liquid crystal display panel having a red tinge (a display having a white point with a low color temperature), white of the confirmation image will be displayed with a red tinge. Also, if the confirmation image is displayed on a liquid crystal panel having a blue tinge (a display having a white point with a high color temperature), white of the confirmation image will be displayed with a blue tinge. Accordingly, the technology disclosed in patent document 1 cannot provide sufficient solution to the current problem with an EVF.

Also, the above described differences in the way color cast is perceived have a significant effect on reproduction of color of a taken image on an EVF. However, current EVFs have not taken this point into consideration, and as a result, while it is possible to reproduce color comparatively close to that of the taken image under particular confirmation conditions, there may be situations where the image appears tinged with blue or tinged red depending on the environment. This is disruptive to the photographer, and impairs the image of the photographer, and impedes them in shooting comfortably. Accordingly, with the conventional EVF accurate reproduction of a taken image regardless of the environment was not possible, and also it was not possible to perform various image adjustments to enable accurate shooting while viewing on the EVF to shoot accurately, and the taking of a photograph could not be performed accurately.

This can be solved to a certain extent by gradually changing display color temperature, as in patent document 2 described above. However, since a person's eyes can only adapt to color temperature of the environment to a certain extent, variation in display color temperature is preferably not performed without considering that color adaptation range.

SUMMARY OF THE INVENTION

An object of the present invention is to provide an imaging device, and electronic viewfinder, and a display control method, with which it is possible to confirm color cast of a taken image in advance regardless of the environment, and taking into consideration the adaptability of the human eye.

An imaging device of the present invention, having an electronic viewfinder with which it is possible to view an image displayed on a display section through an eyepiece, comprises a storage section for previously holding an initial white point of a display panel of the electronic viewfinder, a calculation section for calculating target white point of the display panel of the electronic viewfinder based on light source information for the shooting environment, an eye proximity detection section for detecting whether or not the user's eye is in contact with the electronic viewfinder, a determination section for making a white point range corresponding to an adaptive light source range, which is a light source range in which the user can recognize a white object as being white, an adaptive tracking range, and previously designating that adaptive tracking range, and determining whether or not the initial white point or the target white point are outside the adaptive tracking range, and a display control section for, in the event that has been detected by the eye proximity detection section that the user's eye is close, after commencing display for the display panel of the electronic viewfinder at the initial white point, carrying out control to change the white point of the electronic viewfinder display panel from the initial white point over time, so as to become the target white point, wherein, in the event that is has been determined by the determination section that the initial white point or the target white point is outside the adaptive tracking range, the calculation section calculates a new initial white point or a new target white point so as to be within the adaptive range.

An electronic viewfinder of the present invention, for an imaging device having an electronic viewfinder with which it is possible to view an image displayed on a display section through an eyepiece, comprises a storage section for previously holding an initial white point of a display panel of the electronic viewfinder a calculation section for calculating target white point of the display panel of the electronic viewfinder based on light source information for the shooting environment, an eye proximity detection section for detecting whether or not the user's eye is close to the electronic viewfinder, a determination section for making a white point range corresponding to an adaptive light source range, which is light source range in which the user can recognize a white object as being white, an adaptive tracking range, and previously designating that adaptive tracking range, and determining whether or not the initial white point or the target white point are outside the adaptive tracking range, and a display control section for, in the event that has been detected by the eye proximity detection section that the user's eye is close, after commencing display for the display panel of the electronic viewfinder at the initial white point, carrying out control to change the white point of the electronic viewfinder display panel from the initial white point over time, so as to become the target white point, wherein, in the event that is has been determined by the determination section that the initial white point or the target white point is outside the adaptive tracking range, the calculation section calculates a new initial white point or a new target white point so as to be within the adaptive range.

A display control method of the present invention, for an imaging device of the present invention, having an electronic viewfinder with which it is possible to view an image displayed on a display section through an eyepiece, and a storage section for previously holding an initial white point of a display panel of the electronic viewfinder, comprises a calculation step of calculating target white point of the display panel of the electronic viewfinder based on light source information for the shooting environment, a detection step of detecting whether or not the user's eye is close to the electronic viewfinder, a determination step of making a white point range corresponding to an adaptive light source range, which is a light source range in which the user can recognize a white object as being white, an adaptive tracking range, and previously designating that adaptive tracking range, and determining whether or not the initial white point or the target white point are outside the adaptive tracking range, and a display control step for, in the event that has been detected in the eye proximity detection step that the user's eye is close, after commencing display for the display panel of the electronic viewfinder at the initial white point, carrying out control to change the white point of the electronic viewfinder display panel from the initial white point over time, so as to become the target white point, wherein, in the event that is has been determined in the determination step that the initial white point or the target white point is outside the adaptive tracking range, the calculation step calculates a new initial white point or a new target white point so as to be within the adaptive range.

DETAILED DESCRIPTION OF THE PREFERRED EMBODIMENTS

Preferred embodiments using a camera to which the present invention has been applied will be described in the following in accordance with the drawings. A digital camera of a preferred one embodiment of the present invention has an EVF with which it is possible to view an image displayed on a display section through an eyepiece.

Figure 1:
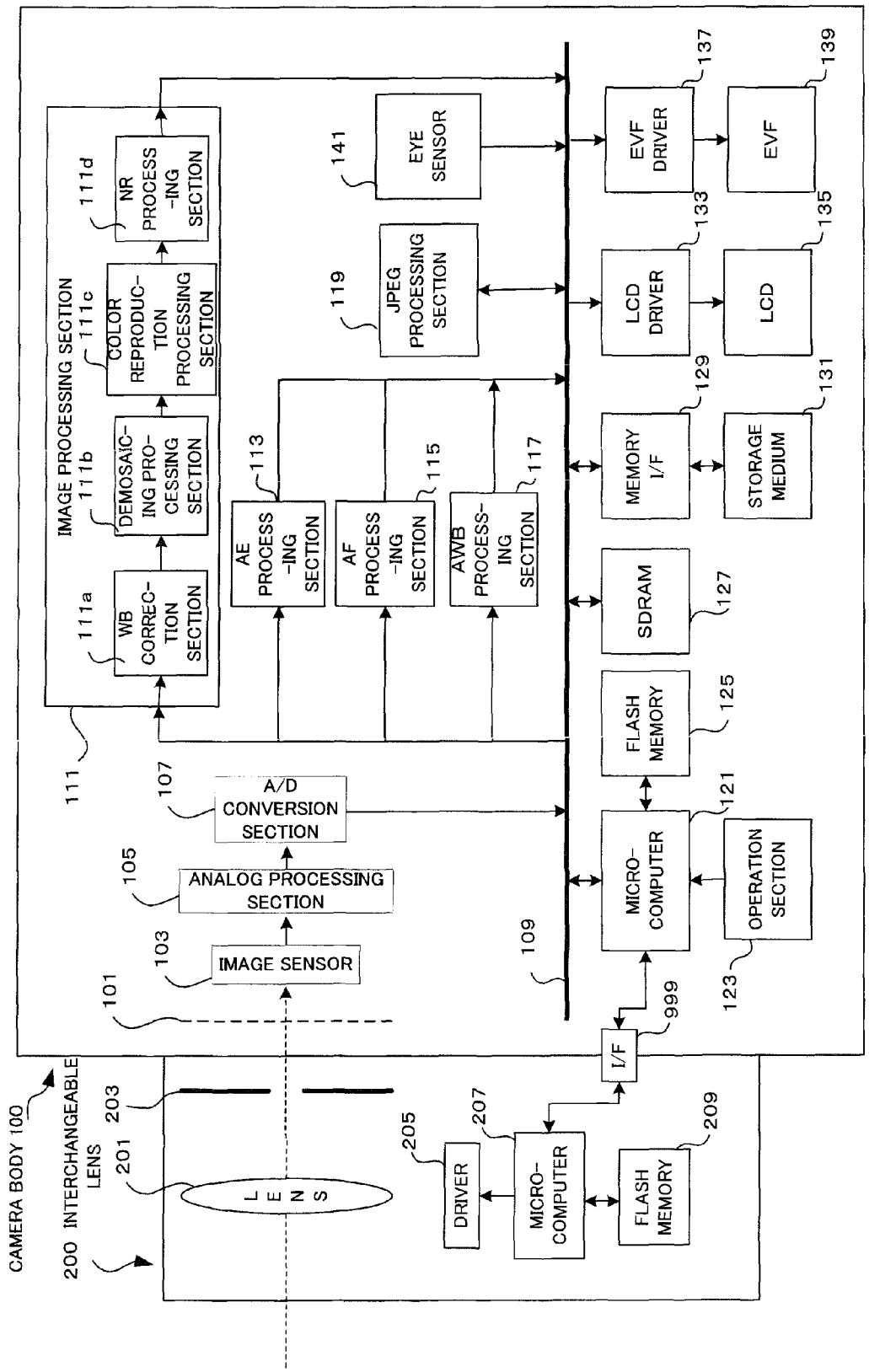
FIG. 1 is a block diagram mainly showing the electrical structure of a camera of one embodiment of the present invention.

FIG. 1 is a block diagram mainly showing the electrical structure of a camera of one embodiment of the present invention. This camera comprises a camera body 100 and an interchangeable lens 200 that can be attached to and removed from the camera body. The lens barrel may also be of a type that is fixed to the camera body.

The interchangeable lens 200 is made up of a photographing lens 201, a diaphragm 203, a driver 205, a microcomputer 207 and a flash memory 209, and has an interface (hereafter referred to as I/F) 999 between the interchangeable lens 200 and the camera body 100, which will be described later.

The photographing lens 201 is an optical lens for forming a subject image, and is constituted by a fixed focal length lens or a zoom lens. The diaphragm 203 is arranged behind this photographing lens 201 on the same optical axis, and the diaphragm 203 has a variable aperture to control subject light flux passing through the photographing lens 201.

Also, the photographing lens 201 is capable of being moved in the optical axis direction by the driver 205, with focus position of the photographing lens 201 being controlled based on control signals from the microcomputer 207, and in the case where the photographing lens 201 is a zoom lens focal length is also controlled. This driver 205 also carries out control of the opening diameter of the diaphragm 204.

The microcomputer 207 that is connected to the driver 205 is connected to the I/F 999 and the flash memory 209. The microcomputer 207 operates in accordance with a program stored in the flash memory 209, to perform communication with a microcomputer 121 within the camera body 100, which will be described later, and performs control of the interchangeable lens 200 based on control signals from the microcomputer 121.

Besides the previously described program, various information such as optical characteristics of the interchangeable lens 200 and adjustment values are stored in the flash memory 209. The I/F 999 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 controls the time for which subject light flux passes, and a well-known focal plane shutter is adopted. Behind this mechanical shutter 101, an image sensor 103 is arranged at a position where the subject image is formed by the photographing lens 201.

The image sensor 103 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array color filter is arranged on the front surface of each pixel. A Bayer array has lines of R pixels and G (Gr) pixels arranged alternately in a horizontal direction, and lines of G (Gb) pixels and B pixels arranged alternately in a horizontal direction, and also has these 3 lines arranged alternately in a vertical direction.

The image sensor 103 is connected to an analog processing section 105, and this analog processing section 105 performs wave shaping on the photoelectric conversion signals (analog image signals) that have been read out from the image sensor 103 and subjected to reset noise reduction etc., and carries out gain increase so as to achieve an appropriate brightness. Adjustment of ISO sensitivity is control achieved by adjusting gain (amplification factor) of analog signals of this analog processing section 105.

This analog processing section 105 is connected to an A/D conversion section 107, and this A/D conversion section 107 performs analog to digital conversion on the analog image signals, and outputs the digital image signals (hereafter referred to as image data) to a bus 109.

The bus 109 is a transfer path for transferring various data, that has been read out or generated inside the camera body 100, within the camera body 100. Besides the previously described A/D conversion section 107, an image processing section 111, AE processing section 113, AF processing section 115, AWB (Auto White Balance) processing section 117, JPEG processing section 119, the microcomputer 121, an SDRAM (synchronous dynamic random access memory) 127, memory interface (hereafter referred to as memory I/F) 129, liquid crystal (hereafter referred to as LCD) driver 133, EVF driver 137 and eye sensor 141 are connected to the bus 109.

The image processing section 111 that is connected to the bus 109 includes a white balance correction section (hereafter referred to as a WB correction section) 111a, demosaicing processing section 111b, color reproduction processing section 111c, and noise reduction processing section (hereafter referred to as NR processing section) 111d, and reads out image data that has been temporarily stored in the SDRAM 127 and performs various image processing on this image data.

The WB correction section 111a carries out white balance correction on image data. White balance correction is correction such that the color white is correctly reflected as white, under light sources of various color temperatures. Either a light source mode, such as clear sky, cloudy sky, shade, tungsten bulb or fluorescent light, is set by the user, or an auto white balance mode for automatically calculating a white balance correction amount at the camera side, can be set by the user, and white balance correction is carried out on the image data in accordance with the mode that has been set by the user. Auto white balance is carried out by the AWB processing section 117, which will be described later.

The demosaicing processing section 111b performs demosaicing processing on image data constituted by R, G B information per single pixel on the image data that has been acquired beneath the Bayer array. The color reproduction processing section 111c carries out gamma correction processing, and color reproduction processing to change the color cast of an image.

The NR processing section 111d carries out processing to reduce noise of the image data by using a filter to reduce a high-frequency components or by coring processing etc. The image processing section 111 selects each of the sections 111a-111d as required and performs respective processing, and temporarily stores image data that has been subjected to image processing in the SDRAM 127 by means of the bus 109.

The AE processing section 113 measures subject brightness, and outputs via the bus 109 to the microcomputer 121. A dedicated photometric sensor for subject brightness measurement may be provided, but in this embodiment subject brightness is calculated using image data that is based on output of the image sensor 103. The AF processing section 115 extracts signals for high frequency components from image data, acquires a focus evaluation value using integration processing, and outputs the focus evaluation value via the bus 109 to the microcomputer 121. In this embodiment, focusing of the photographing lens 201 is carried out using the so-called contrast method. As described above, the AWB processing section 117 automatically calculates white balance correction amount at the camera side, and carries out white balance adjustment.

The JPEG processing section 119 reads out image data from the SDRAM 127 at the time of storing image data to a storage medium 131, compresses the read-out image data in accordance with the JPEG compression method, and temporarily stores this compressed image data in the SDRAM 127. The microcomputer 121 creates a JPEG file by adding a JPEG header, that is required to make a JPEG file, to JPEG image data that has been temporarily stored in the SDRAM 127, and stores this created JPEG file in the storage medium 131 by means of the memory I/F 129.

The JPEG processing section 119 also carries out expansion of JPEG image data for image playback display. With expansion, a JPEG file that has been stored in the storage medium 131 is read out, and after being subjected to expansion processing in the JPEG processing section 119, the expanded image data is temporarily stored in the SDRAM 127. With this embodiment, the JPEG compression system is adopted as the image compression system, but the compression system is not limited to this and other compression systems may be used, such as TIFF, MPEG, and H.264.

The microcomputer 121 provides a function as a camera overall control section, and performs overall control of various sequences of the camera by controlling each section within the camera body 100 and the interchangeable lens 200, in accordance with programs stored in the flash memory 125, which will be described later.

Figure 7:
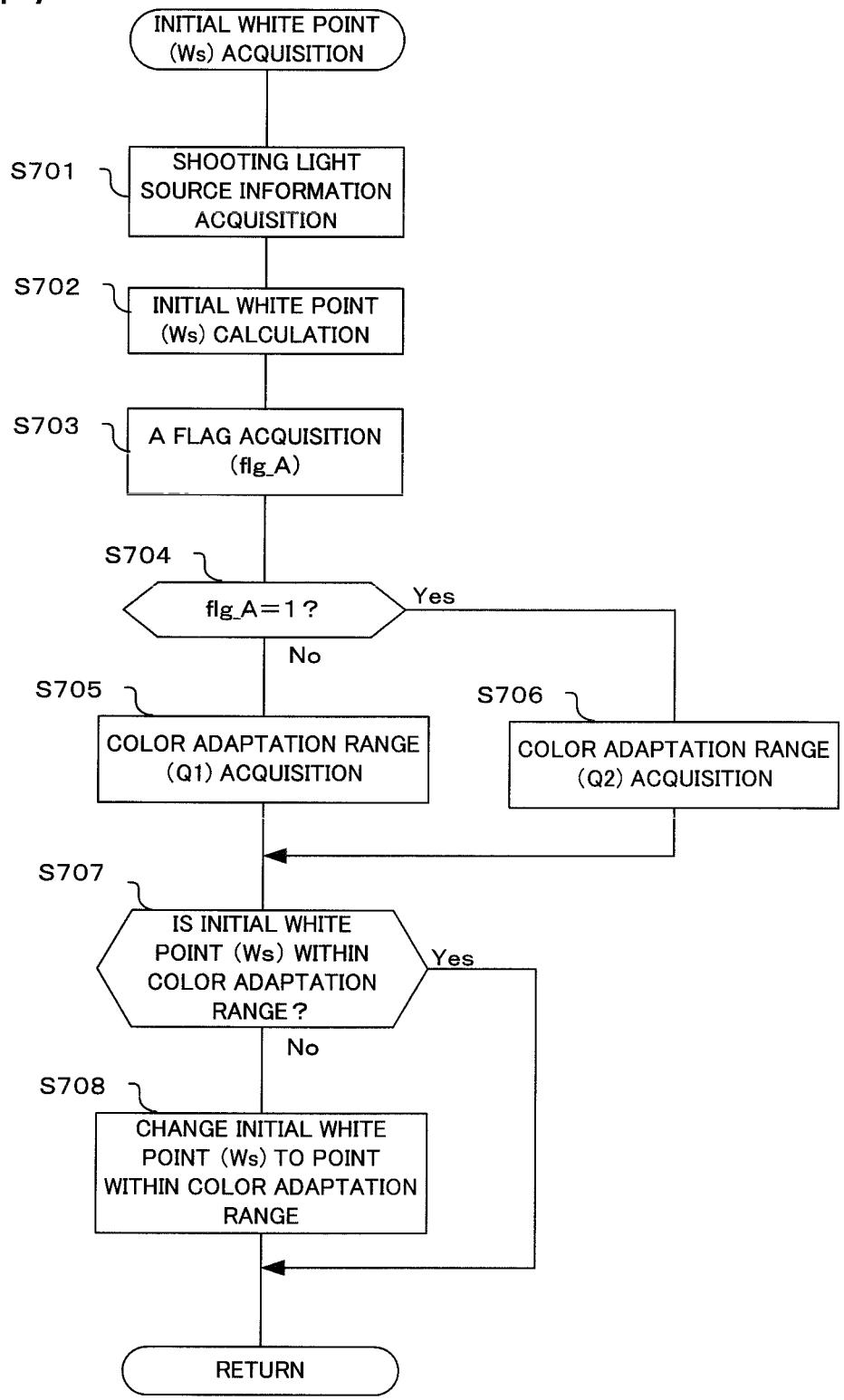
FIG. 7 is a flowchart showing operation for initial white point acquisition, in the camera of one embodiment of the present invention.
Figure 8:
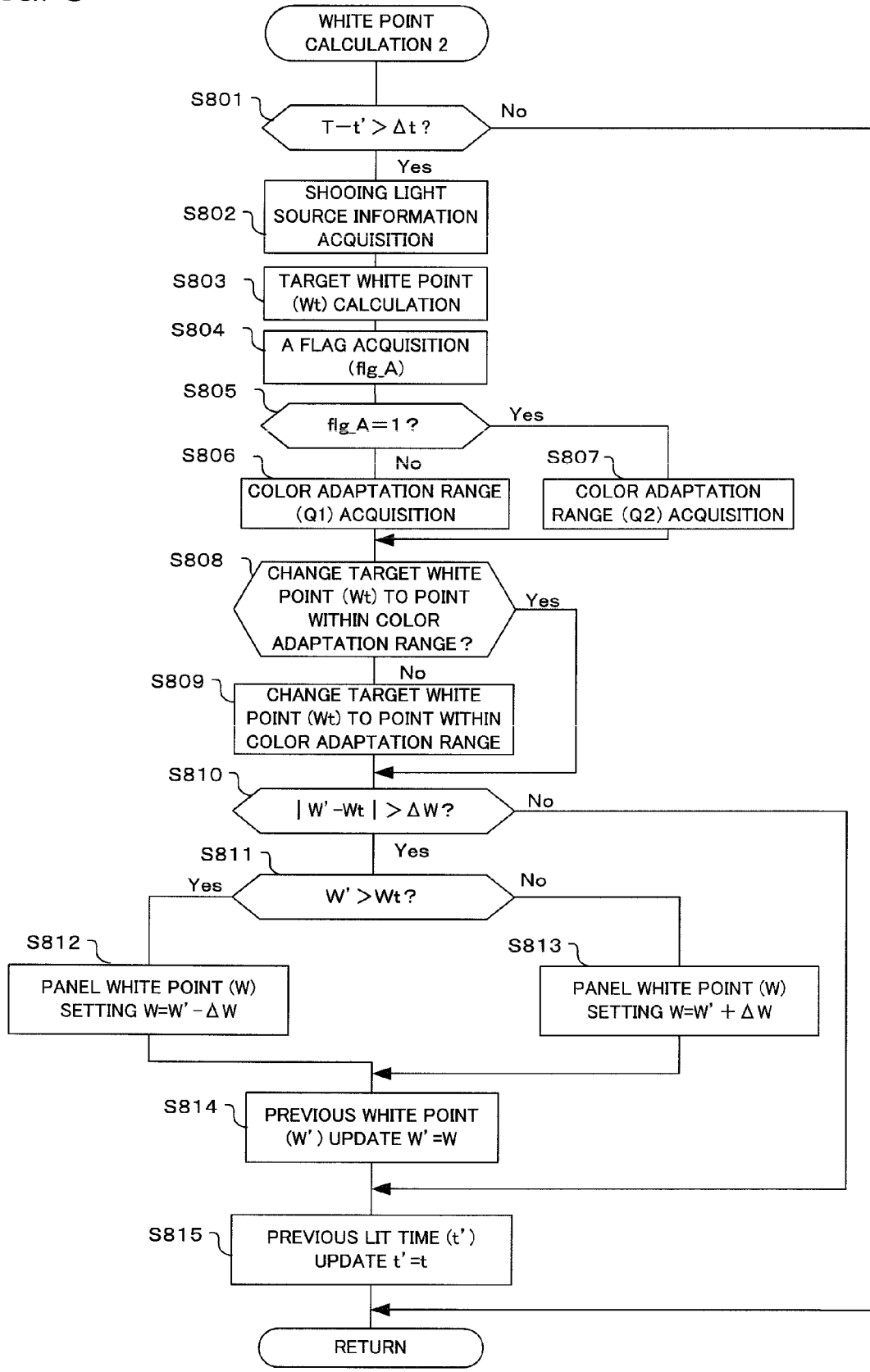
FIG. 8 is a flowchart showing operation for white point calculation 2, in the camera of one embodiment of the present invention.

Also, by controlling each section of the camera, the microcomputer 121 also functions as a calculation section for calculating initial white point or target white point of a display panel of the EVF 139, based on light source information for the shooting environment (refer, for example, to S702 in FIG. 7, S803 in FIG. 8, etc.). This calculation section calculates a new initial white point or new target white point within a boundary of the adaptive tracking range, on a line that passes through a default white point and white point for the light source information of the shooting environment (refer, for example, to S1303 in FIG. 13 and S1403 in FIG. 14).

In the case where the user's eye has been detected by the eye sensor 141, the microcomputer 121 also functions as a display control section for, after display has been commenced on the display panel of the EVF 139 at the initial white point, carrying out control to change the white point of the display panel of the EVF 139 from the initial white point so as to become the target white point after a specified time (Ta) has elapsed (for example, refer to FIG. 8, etc.). In this embodiment, the specified time Ta is not a fixed time, and is a time until the target white point (Wt) (refer to S803 in FIG. 8, for example) is reached, in the case where white point has been changed at a white point change variation ratio (refer, for example, to S602 in FIG. 6), which will be described later. It is also possible to set the specified time Ta to a fixed time, and vary the white point change variation ratio.

Figure 6:
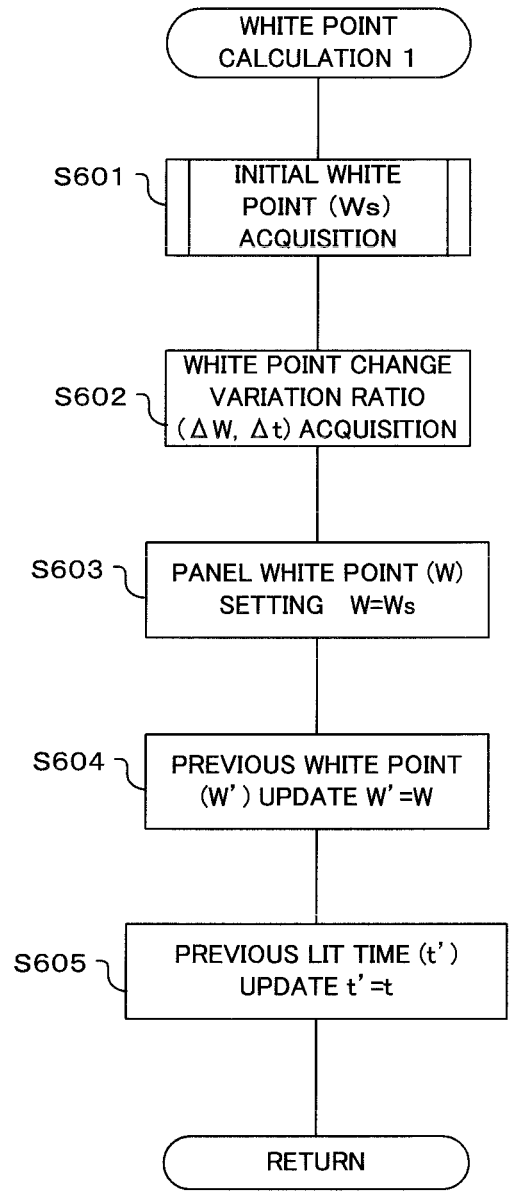
FIG. 6 is a flowchart showing operation for white point calculation 1, in the camera of one embodiment of the present invention.

Also, the microcomputer 121 functioning as a display control section controls variation in white point of the display panel of the EVF 139, based on white point change variation ratio ($\Delta w/\Delta t$) that has been designated in advance, and elapsed time (t) (refer, for example, to FIG. 6 and FIG. 8, and particularly S812 and S813).

Figure 14:
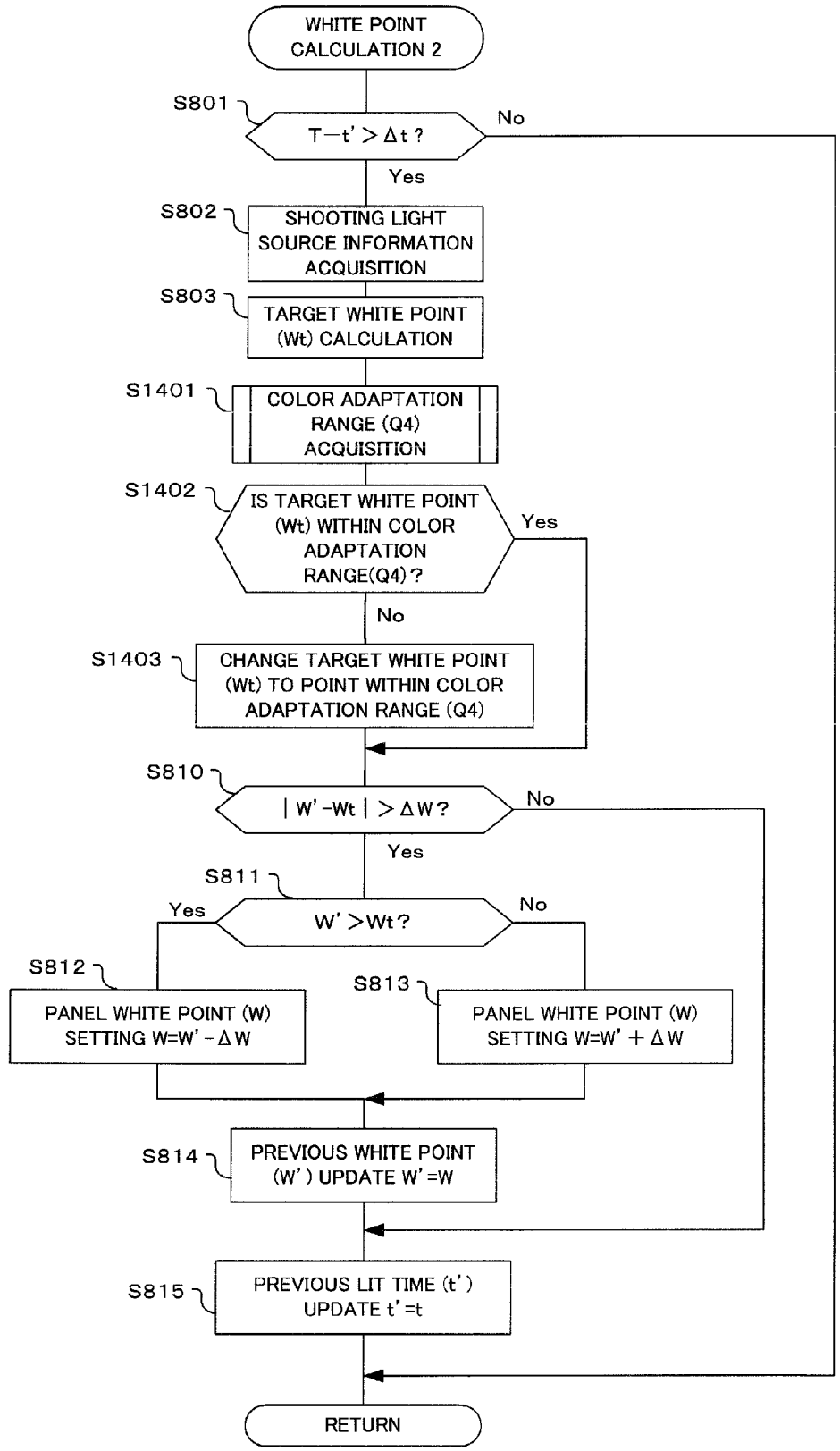
FIG. 14 is a flowchart showing operation for white point calculation 2, in a first modified example of the camera of one embodiment of the present invention.

The microcomputer 121 also functions as a determination section for making a white point range corresponding to adaptive light source range, which is a light source range in which it is possible for the user to recognize a white object a being white, an adaptive tracking range (Q1, Q2, Q4), designating this adaptive tracking range in advance, and determining whether or not the initial white point (for example, Ws) or the target white point (for example, Wt) is outside the adaptive tracking range (for example, S808 and S809 in FIGS. 8, S1402 and S1403 in FIG. 14). In the event that is has been determined by this determination section that the initial white point or the target white point is outside the adaptive tracking range, the calculation section calculates a new initial white point or a new target white point so as to be within the adaptive range (for example, S708 in FIG. 7, S809 in FIG. 8, and S1403 in FIG. 14).

The microcomputer 121 also functions as an adaptive tracking range setting section for setting a switching flag for switching the adaptive tracking range (for example, S703 in FIG. 7, S804 in FIG. 8). The above described determination section is provided with a first adaptive tracking range (for example, Q1 in S705 of FIG. 7, Q1 in S806 in FIG. 8) and a second adaptive tracking range (for example, Q2 in S706 of FIG. 7, Q2 in step S807 of FIG. 8) that is different from the first tracking range, and determines switching of the first adaptive tracking range and the second adaptive tracking range based on the switching flag that has been set by the adaptive tracking range setting section. The above described calculation section also calculates a new initial white point and a new target white point (for example, S708 in FIG. 7, S809 in FIG. 8) so as to be in the first adaptive tracking range or the second adaptive tracking range. Also, the second adaptive tracking range provided for the determination section includes the first adaptive tracking range and is a wider range (for example, Q2 is wider than Q1 in FIG. 11).

A timer having a timing function is also provided within the microcomputer 121. This timer functions as a first timing section for timing an eye time as elapsed time (t) from detection of the users eye by the eye sensor 141 (refer to S508 in FIG. 5, S801 in FIG. 8 etc.).

Besides the previously described I/F 999 an operation section 123 and a flash memory 125 are connected to the microcomputer 121. The operation section 123 includes operation members such as various input buttons, like a power supply button, release button, a movie button, playback button, menu button, cross key button, and OK button, and various input keys, and detects operation states of these operation members and outputs the result of detection to the microcomputer 121. The microcomputer 121 executes various sequences according to user operation based on the result of detection of the operation members from the operation section 123.

The flash memory 125 is an electrically rewritable non-volatile memory, and stores a program for executing the various sequences of the microcomputer 121. The microcomputer 121 carries out control of the digital camera based on this program, as has been described above. Also, the flash memory 125 is pre-stored with information on the initial white point of the display panel of the EVF 139. A default white point is stored as this initial white point. The flash memory 125 also stores a change variation ratio for when changing the white point ($\Delta W$, $\Delta t$).

The SDRAM 127 is an electrically rewritable volatile memory for temporary storage. This SDRAM 127 temporarily stores image data that has been output from the A/D conversion section 107, and image data that has been processed in the image processing section 111, JPEG processing section 119 etc.

The memory I/F 129 is connected to the storage medium 131, and carries out control for reading and writing of data, such as image data and headers attached to image data, to and from the storage medium 131. The storage medium 131 is a memory that can be loaded into and taken out of the camera body, and may be a memory built into the camera body, such as a hard disk.

The LCD driver 133 is connected to the LCD 135, and reads out from the SDRAM 127 and storage medium 131 to display an image on the LCD 135 based on image data that has been expanded by the JPEG processing section 119. The LCD 135 includes an LCD panel on the rear surface or the like of the camera body 100, and performs image display. As image display modes, there are Quickview Display for displaying stored image data for only a short time, playback display of image files for still images and movies that have been stored in the storage medium 131, and movie display such as live view display. In the case of displaying image data that has been compressed, display is carried out after applying expansion processing by the JPEG processing section 119, as was described previously. The display section is not limited to an LCD, and other display panels such as organic EL may also be adopted.

The EVF driver 137 is connected to the EVF 139, and is a circuit for driving and controlling the EVF 139. The EVF 139 has an EVF display panel inside the camera body 100, and with the EVF 139 it is possible to view an image that is displayed on the EVF display panel through the eyepiece. The EVF 139, similarly to the LCD 135, displays an image based on image data that has been read from the SDRAM 127 and the storage medium 131 and expanded by the JPEG processing section 119, with Quickview Display, playback display and live view display being available as image display modes.

While the LCD 135 is arranged on the outside of the camera such as on the rear surface of the camera, the EVF 139 is arranged inside the camera in a state where external light is shielded, which makes it possible to see a screen with the eye close to the eyepiece. In order to detect that an eye is close to the eyepiece, the eye sensor 141 is arranged close to the eyepiece.

The eye sensor 141 outputs a detection signal if a person's face becomes close to the eye sensor 141, and then the microcomputer 121 transmits a control signal to the EVF driver 137 and an image is displayed on the EVF 139. Also, if a person's face is quickly taken away from the eye sensor 141 a non-detection signal is output, and then the microcomputer 121 transmits a control signal to the EVF driver 137 and a non-display state for the image of the EVF 139 is entered. The eye sensor 141 functions as an eye proximity detection section for detecting presence or absence of a user's eye on the EVF.

With the EVF 139 it is possible to carry out more accurate confirmation of color compared to with the LCD 135, since light is shielded from the EVF 139. In the case of displaying an image using liveview display for the purpose of previewing an effect before shooting and after shooting, it is preferable to use the EVF 139.

Figure 2:
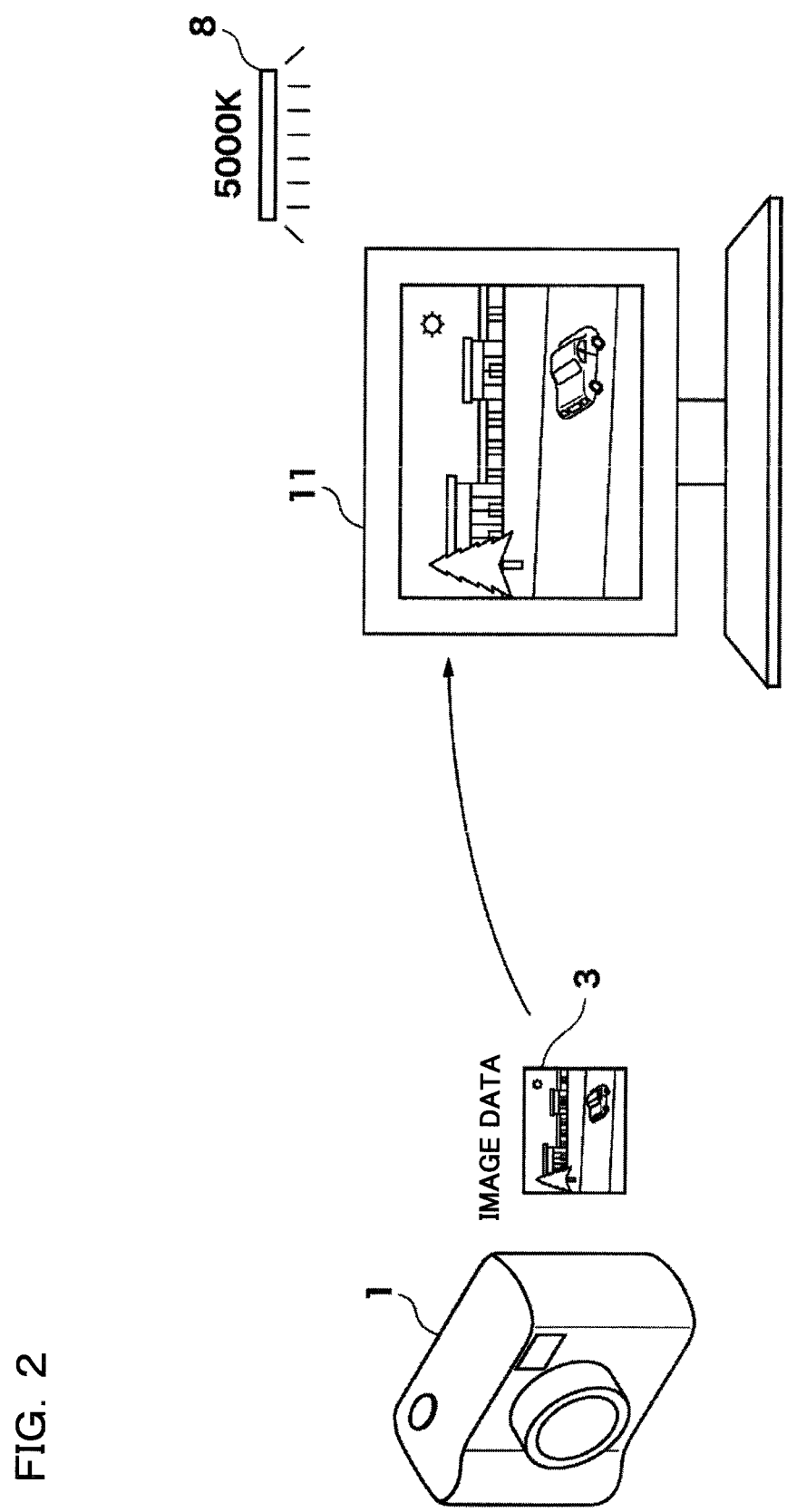
FIG. 2 is a drawing showing the appearance of displaying image data that has been acquired by a camera of one embodiment of the present invention on a monitor.

Next, before describing operation of one embodiment of the present invention, color cast reproduction will be described using FIG. 2 to FIG. 4. FIG. 2 shows the appearance of displaying image data 3 that has been shot with the camera 1 on a monitor 11 from which external light has not been shielded, such as a personal computer. When confirming color of a taken image, the color cast perceived by a person varies due to various factors. One factor is image color itself, and image data 3 is subjected to adjustment of white balance (WB) and color reproduction in accordance with the light source in which the photograph was taken. A second is that there is a light source color of the viewing environment in which an image is confirmed, and hue will vary due to the color that the light source itself has. With the example shown in FIG. 2, the hue of an image displayed on a monitor 11 varies in accordance with light source color of a light source 8 in the viewing environment.

A third factor is white point setting for a display monitor, and this is carried out by setting a color temperature to determine what shade of white a color of white will take. For example, even if image data has white data of (R, G, B)=(255, 255, 255), that white data is displayed with a red tinge on a monitor 11 set to a white point of 4000K, while it is displayed with a blue tinge on a monitor 11 with white point set to 9000K. Specifically, since the hue of a color varies in accordance with viewing environment in which an image is confirmed, in order to accurately confirm a color it is necessary to determine a white point of a display monitor taking into consideration the light source color of the viewing environment. This is generally called color management, and must be dealt with by the photographer or image creator adjusting color precisely.

Accordingly, in the case where a taken image is stored and played back, the color of a stored image is handled at the camera 1 side, while white point of a display monitor and viewing environment light source color must be handled by the user themselves.

Figure 3:
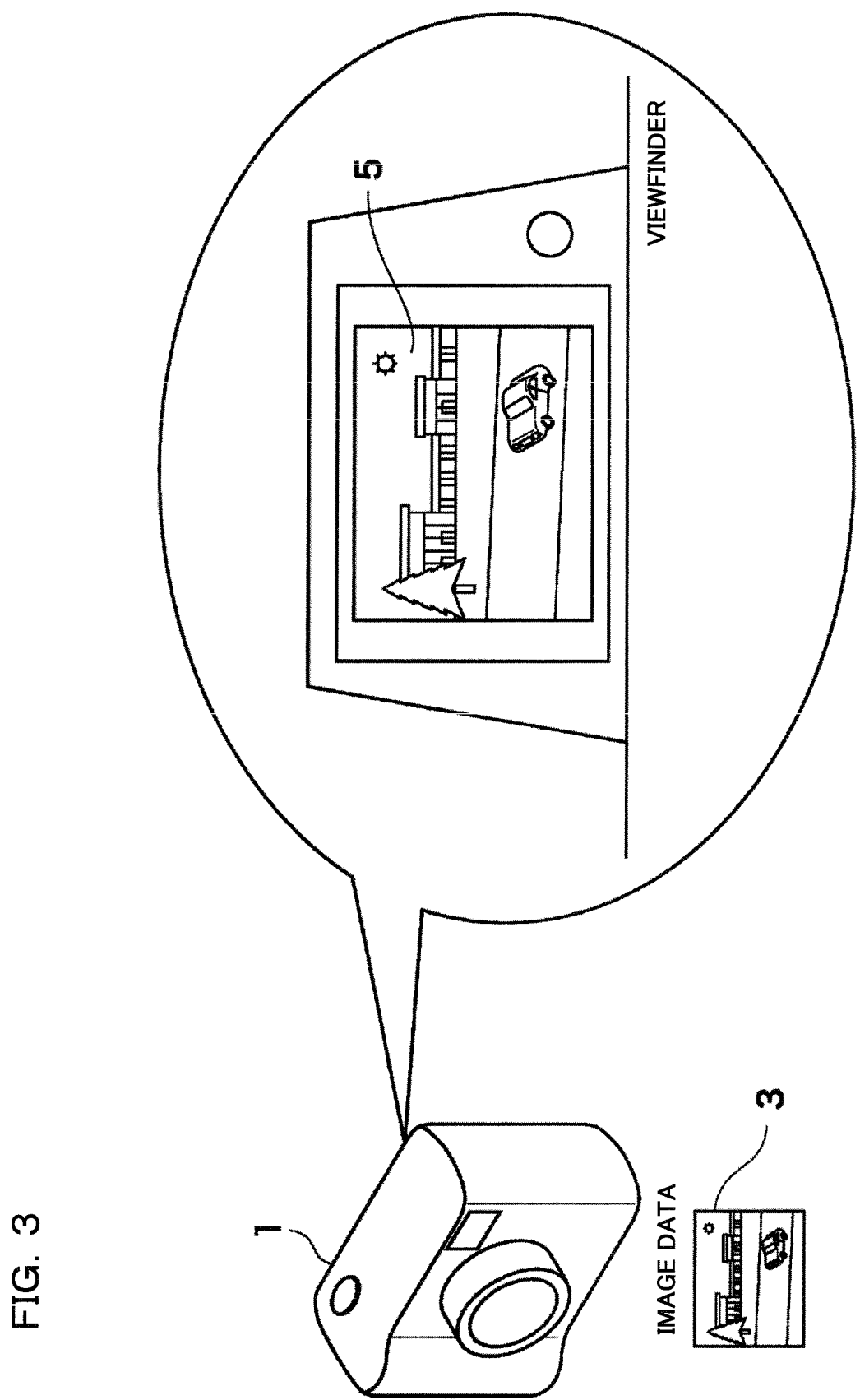
FIG. 3 is a drawing showing appearance of displaying an image on an EVF, in the camera of one embodiment of the present invention.

FIG. 3 shows the appearance of displaying an image 5 on the EVF 139 based on image data 3, when carrying out live view display or playback display of an already stored image. In the case of the EVF 139, since the display monitor is built in to the inside of the camera, it is necessary to deal with color of the display image and white point of the display monitor at the camera side. Since the viewing environment with the EVF 139 cuts out external light, only an image is displayed in total darkness. As a result, as white point for a display monitor, existing cameras almost always take CIE (Commission Internationale de l'Eclairage) standard Illuminant D65 which is a representative light source when confirming and image, or 5500K which is common for photographic daylight (sunlight).

Figure 4:
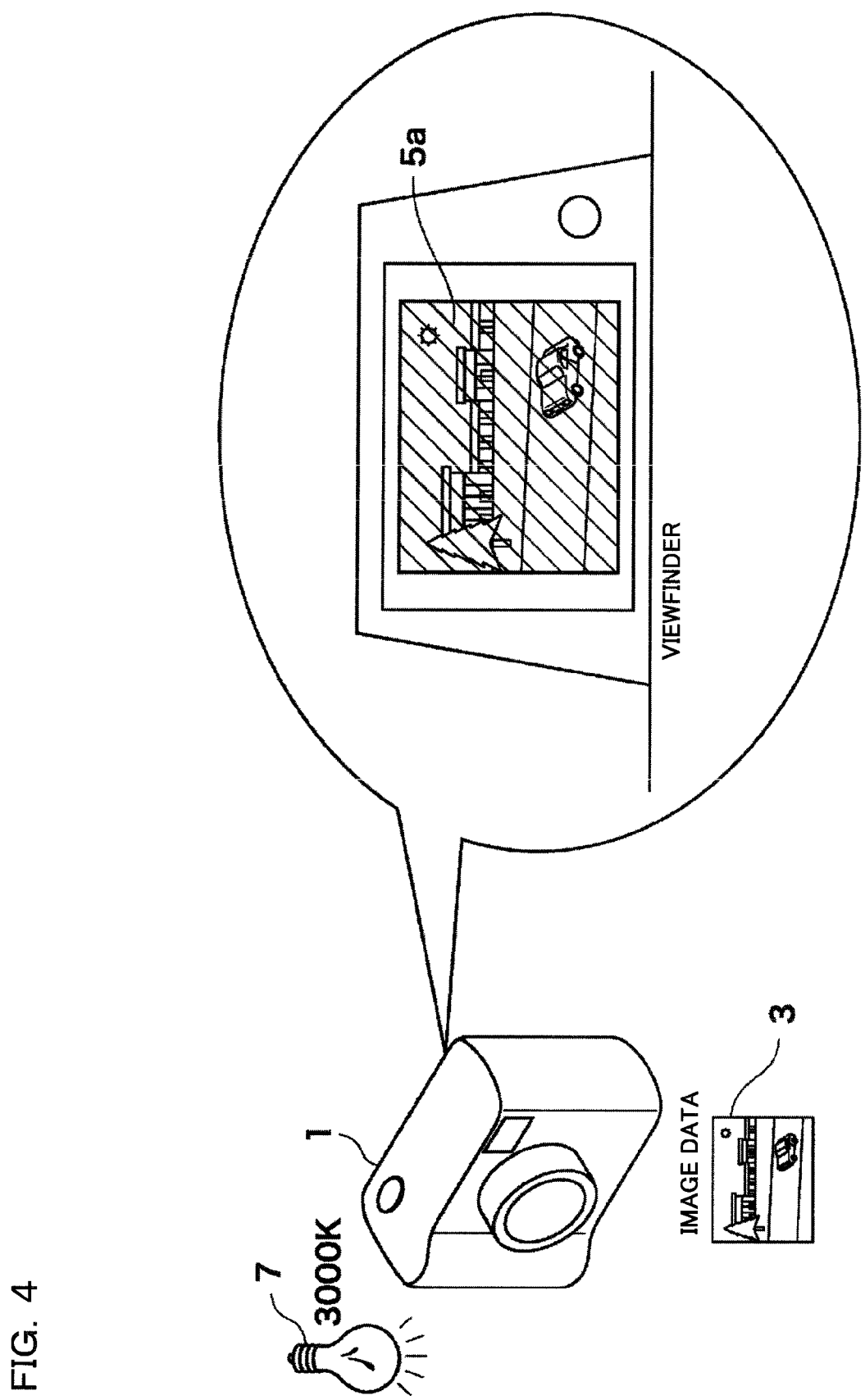
FIG. 4 is a drawing showing appearance of displaying an image on an EVF, in the case where a viewing environment and a shooting environment are different, in the camera of one embodiment of the present invention.

FIG. 4 shows a case where light source color differs for a viewing environment and the shooting environment, when displaying an image on the EVF 139 based on image data 3. In the case of shooting while looking at the EVF 139, the photographer is not constantly looking at the image 5a through the viewfinder. Normally, operations such as confirming composition and field of view after looking at the subject, adjusting tone while looking at the image 5a within the viewfinder after looking at the subject, and adjusting color cast in the view finder after looking at the subject, are repeated, and then a final shooting operation takes place.

In that case, even though the EVF 139 itself is arranged in an environment that is shielded from light, a person's eyes have adjusted to the shooting environment, and so in intended actual use, a light source of a proofing environment will become close to the light source 7 of the shooting environment. However, since white point of a display monitor of an EVF in current cameras is set to D65 or 5500K, as a result, it is very similar to looking at an image in a state where color management has not been carried out. As a result, for example, in a state where the shooting light source 7 is a light bulb, since the photographer looks at the EVF 139 after their eyes have become accustomed to the color temperature of the light bulb, the image 5a that is displayed will appear blue overall.

With this embodiment, an initial white point for the display panel of the EVF 139 is stored, target white point for the display panel of the EVF 139 is calculated based on light source information of the shooting environment, and after commencing display on the display panel of the EVF 139 at the initial white point, by performing control so as to gradually change the white point of the display panel of the EVF 139 from the initial white point to the target white point, the eyes of the photographer that have become accustomed to the surrounding shooting environment will gradually become accustomed to the target color cast. In this way, it is possible to confirm the color cast of a taken image in advance, regardless of the environment in which it is actually taken.

Next, operation of this embodiment will be described using the flowcharts shown in FIG. 5 to FIG. 8. This operation is executed by the microcomputer 121 in accordance with a program stored in the flash memory 125.

Figure 5:
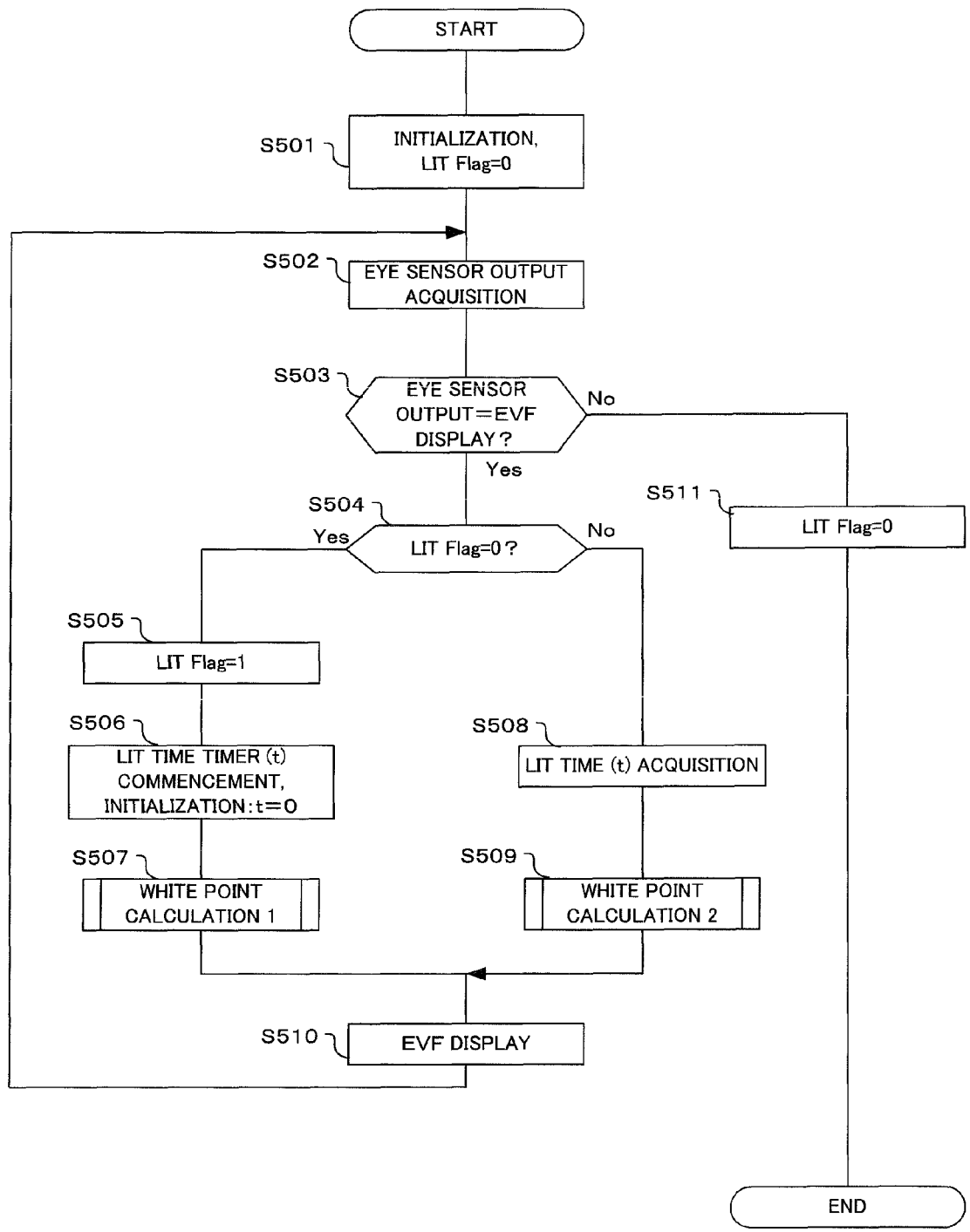
FIG. 5 is a flowchart showing display operation on an EVF display panel, in the camera of one embodiment of the present invention.

If the flow of FIG. 5 is entered, initialization is first carried out (S501). As initialization, here a lit Flag is set to 0. This lit Flag is a flag representing that the display panel of the EVF 139 has switched from an unlit state to a lit state.

If initialization has been carried out, next eye sensor output is acquired (S502). As was described previously, the eye sensor 141 is arranged close to the eyepiece of the EVF 139, and in this step output of the eye sensor 141 is acquired. Whether or not the photographer is looking into the EVF 139 is discerned based on output of this eye sensor 141.

If eye sensor output has been acquired, it is next determined whether or not eye sensor output is EVF display (S503). Here, determination as to whether or not the photographer is looking into the EVF 139 is in accordance with eye sensor output that was acquired in step S502.

If the result of determination in step S503 was not that eye sensor was EVF display, specifically, in the case where the photographer is not looking into the EVF 139, the lit flag is set to 0 (S511). In this case, once the lit flag has been set to 0 this flow is terminated without carrying out EVF display using the EVF 139 in steps S504 and after.

On the other hand, if the result of determination in step S503 is that the eye sensor output is EVF display, it is determined whether or not the lit flag is 0 (S504). Initially, in step S501, since the lit flag was set to 0, after initialization, in the case where eye sensor output is initially EVF display, the lit flag is 0. Also, if the eye sensor output becomes EVF display once, in step S505 the lit flag becomes 1.

If the result of determination in step S504 is that the lit flag is 0, the lit flag is set to 1 (S505). If the lit flag is 0, it has been an unlit state up to that point, the eye sensor output in step S503 is switched to EVF display, and the lit flag is set to 1 for switching from the unlit state to a lit state.

Once the lit flag has been set to 1 in step S505, next a lit time (t) timer is started (S506). With this embodiment, a white point for determining color cast of the EVF 139 is initially an initial white point that is determined in advance, and after the lapse of a specified time, a target white point that has been calculated based on shooting environment and light source information then becomes a white point for determining color cast. The lit time timer (t) that commences a timing operation in this step measures time for this purpose. An initial value for this timer is t=0.

Once the timing operation of the lit time (t) timer has been commenced in step S506, white point calculation 1 is carried out (S507). Here, white point for the display panel at the time of initial display on the EVF 139 is calculated. Detailed operation of this white point calculation 1 will be described later using FIG. 6.

If the result of determination in step S504 is that the lit flag is 1, a lit time (t) is acquired (S508). As was described previously, since the timing operation of the lit timer was commenced in step S506, in this step a lit timer time (t) from commencement of the timing operation is acquired.

Once the lit time (t) has been acquired in step S508, white point calculation 2 is next carried out (S509). If the lit flag is 1, the EVF 139 has been in a lit state, and time has passed since the EVF 139 was lit. Therefore, in this step white point is calculated in accordance with elapsed time. Detailed operation of this white point calculation 2 will be described later using FIG. 8.

Once the white point calculation 1 of step S507 or the white point calculation 2 of step S509 have been carried out, next EVF display is carried out (S510). Here, EVF display is carried out with a color cast corresponding to the white point that was calculated in step S507 or S509. Once the EVF display has been carried out, processing returns to step S502.

In this way, in the flowchart shown in FIG. 5, in the event that the photographer is viewing by looking into the EVF 139 (Yes at S503), if the EVF 139 is being looked into for the first time after initialization a timing operation of a lit time (t) timer is commenced together with performing white point calculation 1 (S506, S507), and EVF display is carried out based on this white point calculation 1 (S510). Then, after carrying out EVF display based on white point calculation 1, if the photographer continues to look into the EVF 139 white point calculation 2 is carried out in accordance with lit time (t) (S508, S509), and EVF display is carried out based on this white point calculation 2 (S510). If the photographer is no longer looking into the EVF 139 (No at S503), the lit flag is set to 0 (S511), and this flow is terminated.

In this flow shown in FIG. 5, for simplicity of description processing is terminated at the stage where EVF display has finished. In actual fact however display is switched to the LCD 135 arranged on the rear surface of the camera body, and in the event that it is determined from the eye sensor 141 that the eye of the photographer has moved close to the EVF 139 during display on the LCD 135 and there is a switch to EVF display, processing is executed again from step S501.

Next, detailed operation of the white point calculation 1 of step S507 will be described using FIG. 6. As was shown in FIG. 5, this white point calculation 1 is executed when switching the display panel of the EVF 139 from an unlit state to a lit state.

If the flow for this white point calculation 1 is entered, first an initial white point (Ws) is acquired (S601). The initial white point here may be a default white point that is set in advance for the camera, or may be a white point that has been calculated on the basis of shooting light source information, as shown in FIG. 7. In the case where a default white point is used, the default white point is stored in advance in the flash memory 125, and this value is read out. As the initial white point (Ws) at that time, CIE Standard Illuminant D65 or 5500K which is common as daylight (sunlight) for a photograph, are used.

If the initial white point (Ws) has been acquired, then next a white point change variation ratio ($\Delta W$, $\Delta t$) is acquired (S602). This white point variation ratio represents amount of variation ($\Delta W$) in color temperature per unit time ($\Delta t$), and since a change variation ratio when changing white point is stored in the flash memory 125, this change variation ratio is read out. A white point change step $\Delta W$ expressing amount of change in white point, and change interval $\Delta t$ relating to frequency of carrying out that $\Delta W$ change, are held as change variation ratio information. The change variation ratio here may be determined by referencing a change variation ratio for WB gain of an image at the time of setting white balance. For example, in the case where white balance is changed once every 200 ms so as to converge within three seconds, white point change variation ratio may be determined taking this into consideration.

Once the white point change variation ratio ($\Delta W$, $\Delta t$) has been acquired in step S602, next setting of panel white point (W) is carried out such that W=Ws (S603). Here, the initial white point (Ws) that was acquired in step S601 is set as the white point (W) of the display panel of the EVF 139.

If setting of the white point (W) of the display panel has been carried out, next update of the previous white point (W') is carried out so that W'=W (S604). Here, in order to use in subsequent processing, the previous white point (W') is set to the white point (W) of the display panel of the EVF 139 that was set in step S603.

Once update of the previous white point (W') has been carried out, next update of the previous lit time (t') is carried out so that t'=t (S605). Here, in order to use the above-described processing, the previous lit time (t') is set to the lit time (t) that was set in step S506 (referred to FIG. 5). Once update of the previous lit time (t') has been carried out, the originating flow is returned to.

Next, detailed operation of acquiring the initial white point (Ws) in step S601 will be described using FIG. 7. If the flow shown in FIG. 7 is entered, first shooting light source information is acquired (S701). Here, similarly to the target white point, light source information is acquired as the initial white point, and not a fixed white point such as D65 or 5500K.

If the shooting light source information has been acquired, next the initial white point (Ws) is calculated (S702). Here, the initial white point (Ws) is calculated based on the shooting light source information that was acquired in step S701. In this case, since the target white point (Wt) step S803 (FIG. 8), which will be described later, also becomes the white point that was calculated based on shooting light source information, at the time the EVF 139 is lit, a white point change operation is not carried out.

However, the shooting light source information of step S802 and the target white point (Wt) of step S803 are applied every change interval $\Delta t$ that was acquired in step S602. Therefore, when the EVF 139 is being looked into, in cases such as where the light source of the shooting environment has changed, the target white point (Wt) is changed in accordance with the light source change, and white point (Wt) of the display panel of the EVF 139 is also changed so as to track the target white point change as time passes.

Once the initial white point (Ws) has been calculated in step S702, next an A flag (flg_A) is acquired (S703). As the A flag, it is possible to use presence or absence of a color cast leaving flag, for setting whether or not a color cast remains in the image itself displayed on the EVF 139, for example. Image data for display on the EVF 139 is subjected to WB (white balance) processing at an image processing stage, and at that time, with a light source having a strong color cast, such as a light bulb, there may be cases where "color cast leaving processing" for intentionally leaving a color cast, is carried out. With the flag setting of this step as WB processing for the image data, and for image data that has been subjected to processing with color cast leaving, flg_A is set to 1, while for image data that has been subjected to image processing without color cast leaving flg_A is set to 0.

Also, with the A flag acquisition of step S703, the A flag may be acquired based on setting by a user on a camera menu screen, or an operating state of a dedicated button. Further, using a gain value for WB processing of the image data, it may be determined that there is not color cast leaving (flg_A=0) if the gain value is larger or smaller than a specified value, or a specified area may be provided in RGB space using RGB data at the time of WB processing, it may be determined that there is not color cast leaving (flg_A=0) if the RGB data is outside this area. In the case of using a menu screen or a dedicated button, there is the advantage that it is possible to accurately reflect the user's intentions, while in the case of using WB again, there is the advantage that is possible to automatically carry out determination within the camera.

If the A flag has been acquired in step S703, it is next determined whether or not the A flag is 1 (S704). Here, determination is based on the A flag (flg_A) that was acquired in step S703.

Figure 11:
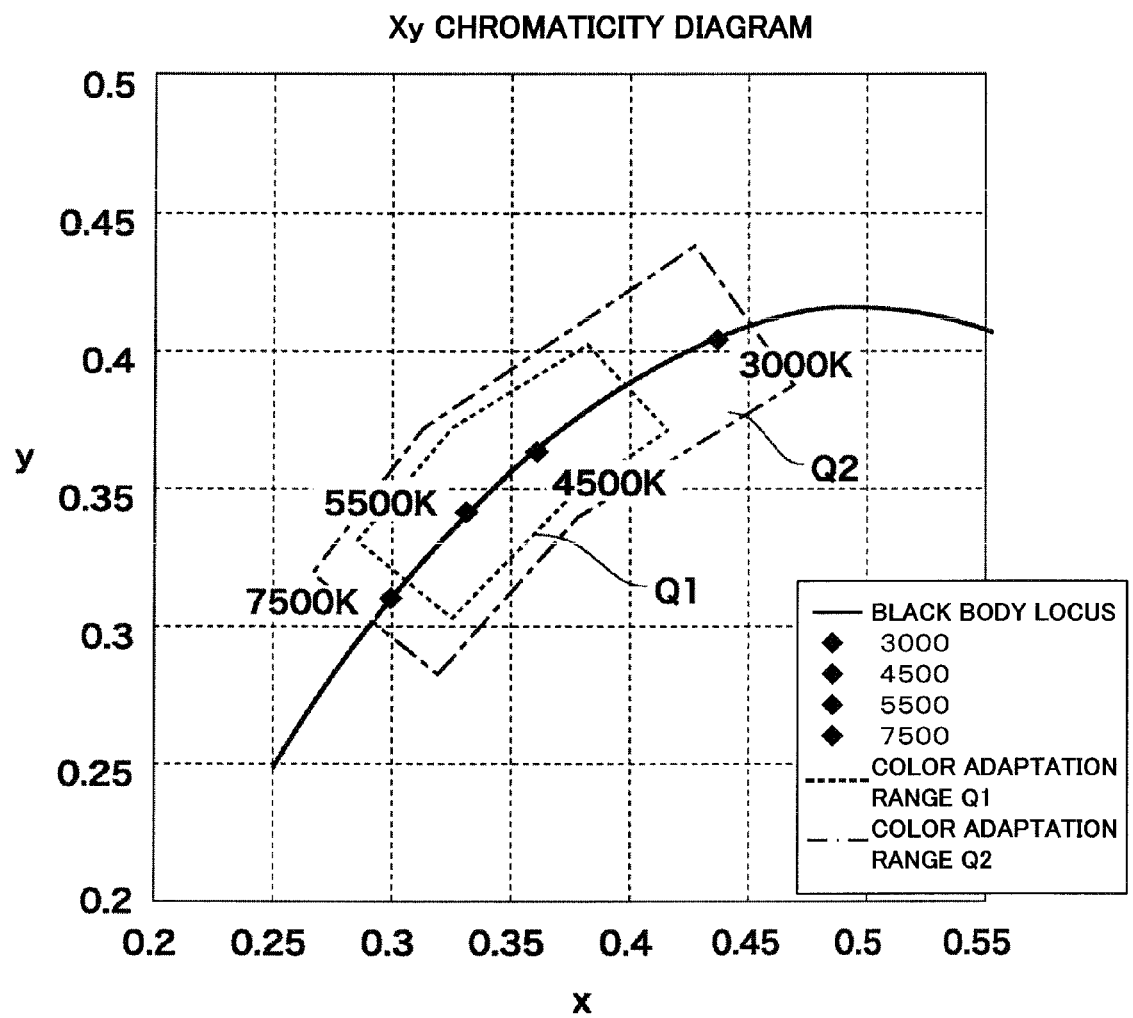
FIG. 11 is a graph showing a color adaptation range on an xy chromaticity diagram, in the camera of one embodiment of the present invention.

If the result of determination in step S704 is that the A flag (flg_A) was not 1 (specifically, flg_A=0), a color adaptation range (Q1) is acquired (S705). As image WB processing, in the case of displaying image data that has been subjected to processing without color cast leaving on the EVF panel, in an environment that appears tinged, in order to make the image appear as tinged as it should be, a color adaptation range (Q1) that assumes that there is a color tinge is acquired as a range of white point settings for the EVF panel. The color adaptation range Q1 is a range that is narrower than the color adaptation range Q2, as shown in FIG. 11.

On the other hand, if the result of determination in step S704 was that the A flag (flg_A) was 1 (namely, flg_A=1), color adaptation range (Q2) is acquired (S706). In the event that image data that has been subjected to processing with color cast leaving, as WB processing of the image, is displayed on the EVF panel, color cast leaving has already been performed on the image data. Therefore, in an environment that appears tinged already, in order to make the image appear as tinged as it looks, as a range of white point settings for the EVF panel, it is not necessary to appear tinged, and color adaptation range (Q2) is acquired taking this into consideration. The color adaptation range Q2 is a wider range than the color adaptation range Q1, as shown in FIG. 11.

In this way in steps S705-S706 the color adaptation range is changed, and so it is possible to prevent the effect of color cast leaving processing of the image data itself, and the effect of color cast leaving processing at the EVF white point having a double impact. Specifically, if image data that has already been subjected to color cast leaving processing is displayed as an image on the EVF panel having an EVF white point that has been calculated taking into consideration color cast leaving processing, it becomes impossible to correctly display the color cast of a taken image, but with this embodiment it is possible to solve this problem by changing the color adaptation range.

Once the color adaptation range Q1 or Q2 has been acquired in step S705 or S706, it is next determined whether or not the initial white point (Ws) is within the color adaptation range (S707). Here, it is determined whether or not the initial white point (Ws) that was calculated in step S702 is within the color adaptation range that was acquired in step S705 or S706.

If the result of determination in step S707 is that the initial white point (Ws) is not within the color adaptation range, the initial white point (Ws) is changed so as to fall within the color adaptation range (S708). This change of the initial white point (Ws) will described later using FIG. 12.

If the result of determination in step S707 is that the initial white point (Ws) is within the color adaptation range, the initial white point (Ws) is not changed and that value is used as it is. Once the change to the initial white point (Ws) has been carried out in step S708, or if the result of determination in step S707 was that the initial white point (Ws) walls within the color adaptation range, the flow for initial white point (Ws) acquisition is completed and the originating flow is returned to.

Next, detailed operation of the white point calculation 2 of step S509 will be described using FIG. 8. This white point calculation 2 is white point calculation processing for when displaying the next image, in a state where the display panel of the EVF 139 is already lit, as was shown in FIG. 5.

If the white point calculation 2 flow is entered, it is first determined whether or not t−t'>Δt (S801). Here, it is determined whether or not a difference between the current lit time (t) that was acquired in step S508 (refer to FIG. 5) and the previous lit time (t') is greater than the change interval Δt. If the result of this determination is that the difference is small, the flow for white point calculation 2 is terminated and the originating processing flow is returned to.

If the result of determination in step S801 is that the expression t−t'>Δt holds, next shooting light source information is acquired (S802). The light source information is acquired from RGB data from the image sensor 103, or from detection signals of a dedicated light source detection sensor.

If the shooting light source information has been acquired, next the target white point (Wt) is calculated (S803). The calculation of the target white point (Wt) varies according to the acquired light source information. For example, in the case where spectral information of a light source is obtained using sensor module/color sensors of different transmittances, as disclosed in Japanese patent laid open number 2009-296102, or Japanese patent laid open number 2011-211317, as light source sensors, tristimulus values X, Y, and Z are calculated based on that spectral information $S(\lambda)$, and $X(\lambda)$, $Y(\lambda)$ and $Z(\lambda)$ relating to XYZ isochromatics conforming to the CIE 1931-2 deg standard observer (refer to equations (1)-(3) below), and if chromaticities x and y on an XY plane are calculated from these values (refer to equations (4) and (5) below) it is possible to calculate correlated color temperature.

$$X = s(\lambda)*X(\lambda) \quad (1)$$

$$Y = s(\lambda)*Y(\lambda) \quad (2)$$

$$Z = s(\lambda)*Z(\lambda) \quad (3)$$

$$x = X/(X+Y+Z) \quad (4)$$

$$y = Y/(X+Y+Z) \quad (5)$$

Among the many types of light source sensor, there is a light source sensor for detecting a ratio of visible light W(VL) and infrared light W(IR), not a spectrum. In the case of a florescent tube, since infrared light is generally not included, W(IR)/W(VL) becomes small, while in the case of a photoflood lamp such as a light bulb, W(IR)/W(VL) becomes large compared to a daylight light source, such as sunlight.

In the case of this type of light source sensor for detecting a ratio of visible light to infrared light, it is only necessary to estimate a final color temperature together with light source estimation using WB gain of an image, by changing an estimation method and changing a weight for every light source at the time of determination, based on output results from the light source sensor.

If the target white point (Wt) has been calculated in step S803, next, similarly to step S703, the A flag (flg_A) is acquired (S804). Next, similarly to step S704, it is determined whether or not flg_A=1 (S805). If the result of this determination is not that flg_A=1 then the color adaptation range (Q1) is acquired (S806), similarly to step S705, while if flg_A=1 the color adaptation range (Q2) is acquired (S807), similarly to step S706.

If acquisition of a color adaptation range has been carried out in step S806 S807, it is next determined whether or not the target white point (Wt) is in the color adaptation range (S808). Here, it is determined whether or not the target white point (Wt) that was acquired in step S803 is within the color adaptation range that was acquired in steps S806 or S807.

If the result of determination in step S808 is that the target white point (Wt) is not within the color adaptation range, the target white point (Wt) is changed to a point within the color adaptation range so that the target white point falls within the color adaptation range (S809). This changing will be described later using FIG. 12. If the result of determination in step S808 is that the target white point (Wt) is within the color adaptation range, that value is used as it is without changing the target white point (Wt).

If the target white point (Wt) has been changed in S809, or if the result of determination result of determination result of determination in step S808 was that the target white point (Wt) was within the color adaptation range, it is next determined whether or not |W'−Wt|>ΔW (S810). Here, it is determined whether or not an absolute value of the difference between a previous white point (W') that was set in step S604 or in step S814 which will be described later, and the target white point (Wt) that was calculated in step S803, is greater than a white point change step ΔW that was acquired in step S602. If the result of this determination is that the absolute value of the difference is smaller than the white point change step ΔW, then since the setting is already close to the target white point steps S811-S814 are skipped and processing advances to step S815.

On the other hand, if the result of determination in step S810 is that the absolute value of the difference is larger than the white point change step ΔW, it is determined whether or not the previous white point (W') is larger than the target white point (Wt) (S811).

If the result of determination in step S811 is that W'>Wt, then a panel white point (W) is set based on W=W'−ΔW (S812). Here, by subtracting the white point change step ΔW from the previous white point (W'), a value that is close to the target white point is made the white point (W) of the display panel of the EVF 139.

If the result of determination in step S811 is not that W'>Wt, then a panel white point (W) is set based on W=W'+ΔW (S813). Here, by adding the white point change step ΔW to the previous white point (W'), a value that is close to the target white point is made the white point (W) of the display panel of the EVF 139.

If the panel white point (W) has been set in step S812 or S813, next update to the previous white point (W') is carried out, to give W'=W (S814). Here, for the next and subsequent times, the value of a previous white point (W') used in steps S810, S811, S812 and S813 is updated.

Also, if update to the previous white point (W') has been carried out, or if the result of determination in step S810 was that the difference value was smaller than ΔW, next update to the previous lit time (t') is carried out to give t'=t (S815). Here, for the next and subsequent times, the value of a previous lit time (t') used in step S801 is updated. If update to the previous lit time (t') has been carried out in step S815, or if the result of determination in step S801 was that t−t' was smaller than Δt, the originating flow is returned to.

In this way, in the flowcharts shown in FIG. 6-FIG. 8, by setting the light source of a viewing environment to a white point of a display monitor in accordance with light source of the shooting environment, processing is carried out so that a color cast of a view image becomes close to the color cast of a final taken image. Further, since a person's eyes have become accustomed to the shooting environment, processing is carried out taking color adaptation into consideration.

Figure 9:
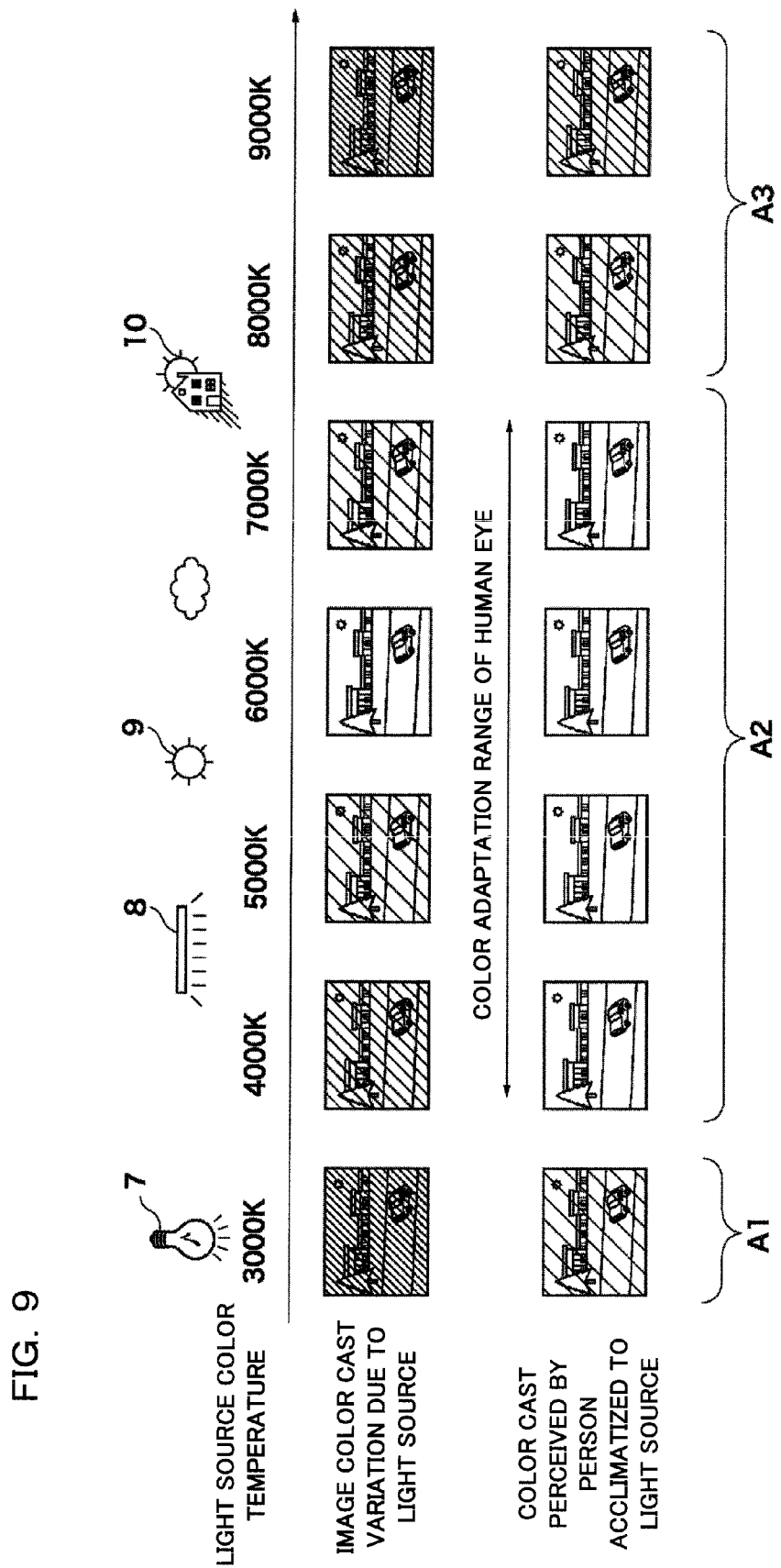
FIG. 9 is a drawing showing a relationship between color temperature of a light source and color cast variation, with the camera of one embodiment of the present invention.

Here, color adaptation is a characteristic whereby a person's eyes or brain cope with environmental changes, and in a case where everything is tinged due to differences in environment (light source), if there is some difference in color cast a person absorbs that difference and recognizes that a white object is white. Normally, color cast differs according to light source even for the same image (refer to "variation in color cast of an image due to light source" in the middle of FIG. 9), and in a case where color temperature of the light source is low a red tinge is imparted, while if color temperature is high a blue tinge is imparted.

Conversely, since a person's eyes adapt, "white" will be recognized as "white" up to a particular range, and at the point that this range is exceeded a color fogging will be perceived. With the example shown in FIG. 9, the horizontal axis shows temperature of a light source, and typical light sources 7-10 are shown. For these color temperatures, a region A2 is a color adaptation range of the human eye, where "white" will be recognized as "white". In region A1 of a lower color temperature than the region A2, "white" will be perceived as reddish, and in region A3 which is a higher color temperature region than region A2, "white" will be perceived as bluish.

With this embodiment, therefore, setting of a white point for the display panel of the EVF 139 is carried out based on the color adaptation range of the human eye and the light source of the shooting environment, to give an optimal color cast.

In the flowchart shown in FIG. 5-FIG. 8, an example was described using "presence or absence of color cast leaving of an image" as the A flag and the color adaptation range. However, besides this example, it is possible, for example, to determine validity of shooting light source information from "Bv value for subject field luminance", and in the event that reliability of the shooting light source information is low, narrow the color adaptation range so as not to be affected by the erroneous shooting light source information. It is also possible to determine divergence between WB gain of an image and shooting light source information from "focal length" information, and to avoid adverse effects by narrowing the color adaptation range by taking into consideration inaccuracies in the shooting light source information that arise in the case where a shooting environment and an image environment are significantly different, such as a telephoto scene.

Further, in a case such as where light source varies frequently in a short time, due to "temporal variations in light source information", the color adaptation range may be narrowed in order to alleviate this unnaturalness, so as to give stable white point display. Further, color adaptation range may be set depending on landscape or indoor shooting, using "scene determination" or "subject determination", so as to give a natural appearance regardless of the environment. Sudden variations in subject accompanying panning may be detected using "Gyro" or "movement determination", and setting of color adaptation range changed placing priority on stability of color cast.

In this way, by taking action in accordance with various circumstances, it is desirable to adopt color adaptation range to be set and determination criteria that correspond to the situation. In this way, it is possible to alleviate the feeling of discomfort immediately after looking into the viewfinder, and even in cases where the viewfinder is continually looked into, to track that variation and realize stabilized viewfinder viewing.

Figure 10:
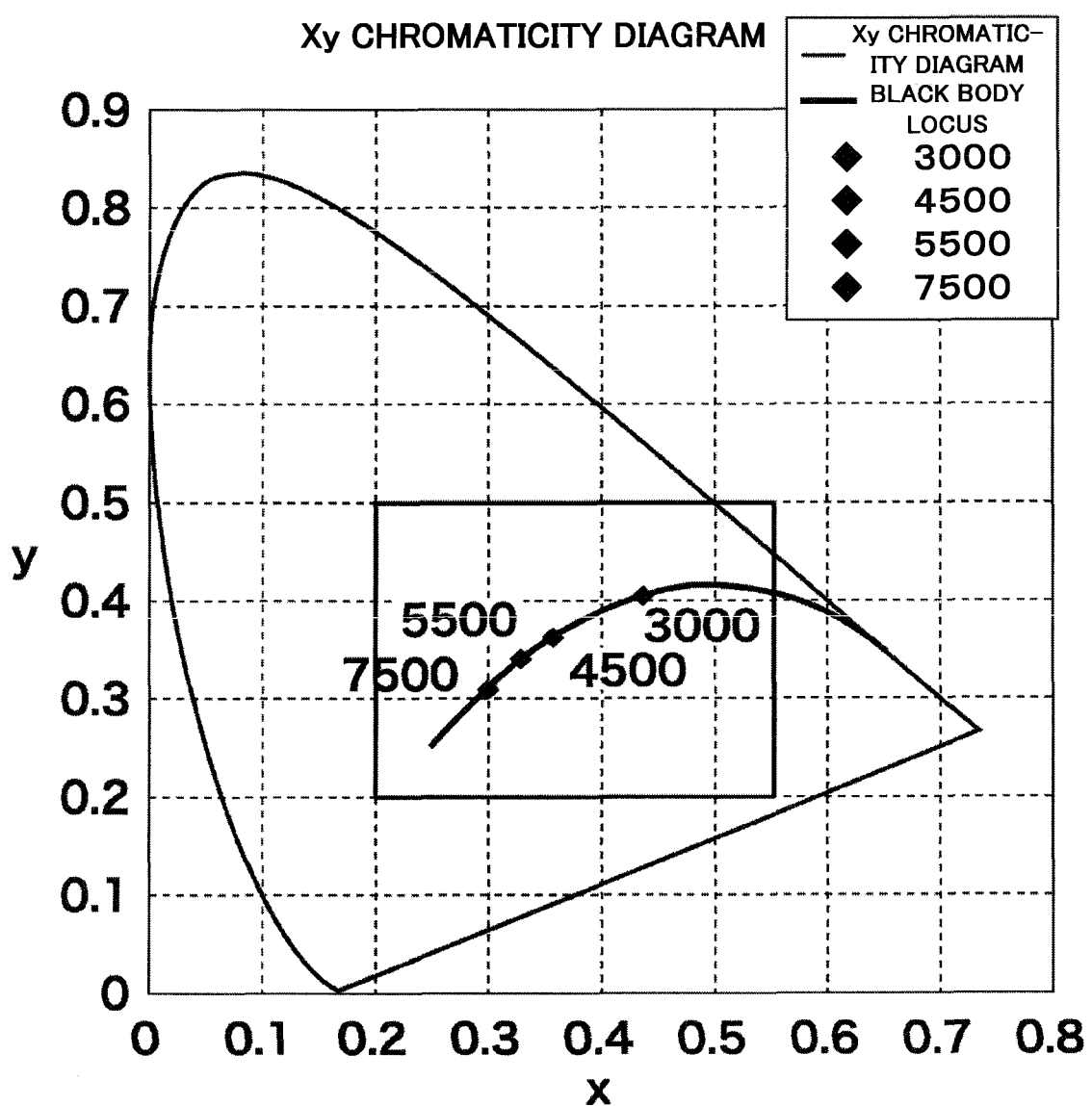
FIG. 10 is a graph showing a color temperature curve displayed using an xy chromaticity diagram, in the camera of one embodiment of the present invention.

Next, the color adaptation range will be described using FIG. 10-FIG. 12. In the explanations so far, the initial white point, target white point, and color temperature tracking range have been dealt with as a one-dimensional characteristic called "color temperature", but it is not necessary to have a one-dimensional characteristic. For example, color may also be represented by a common xy chromaticity diagram. FIG. 10 shows a color temperature curve shown on an xy chromaticity diagram, and this color temperature curve is called a black body locus or black body radiation.

FIG. 11 is an expanded view of part of FIG. 10 (a range of x-coordinate 0.2-0.55, y-coordinate 0.2-0.5). The color adaptation range Q (range shown by the dotted line) is designated on the xy chromaticity diagram, and a light source position on the xy plane is calculated from shooting light source information. The range Q1 is a range corresponding to the color adaptation range (Q1) of S705 in FIG. 7 and S806 in FIG. 8, and the range Q2 is a range corresponding to the color adaptation range (Q2) of step S706 in FIG. 7 and step S807 in FIG. 8.

Figure 12:
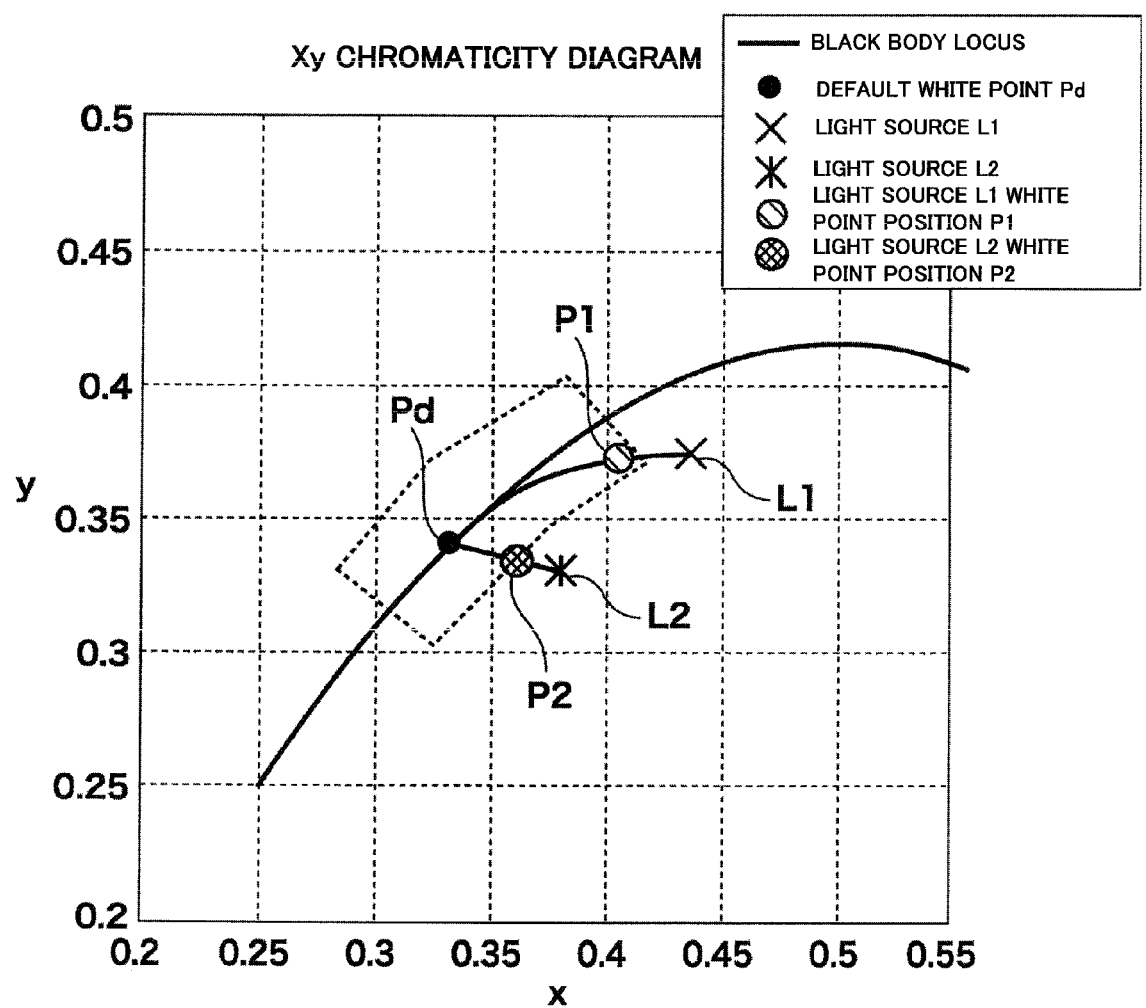
FIG. 12 is a graph showing setting of an initial white point position, that is outside a color adaptation range, in a color adaptation range, on an xy chromaticity diagram, in the camera of one embodiment of the present invention.

Also, FIG. 12 shows light source L1 and light source L2 as examples of calculated light source position. In the case of taking color adaptation into consideration, D65 or 5500K is designated as a default white point, and made the default white point Pd. The dotted line represents color adaptation range Q1 or Q2. The dotted line may be replaced with Q1 or Q2.

Points close to where straight lines or curved lines joining the default white point Pd and each light source position (with the example of FIG. 12, light sources L1 and L2) cross the boundary of the color adaptation range Q can be made white point (W) for the display panel of the EVF 139 (with the example of FIG. 12, white point positions P1 and P2). Specifically, in steps S708 and S809 initial white point (Ws) and target white point (Wt) are rewritten, but the initial white point and target white point here correspond to points where the color adaptation range Q shown by the dotted line is crossed (with the example of FIG. 12, white point positions P1 and P2). With the example of FIG. 12, the white point position P1 is an example within the color adaptation range Q, and white point position P2 is an example on the boundary. Also, the default white point Pd and the light source L1 is an example joined by a curved line, while the default white point and the light source L2 is an example joined by straight line.

In the example shown in FIG. 12, if color temperatures corresponding to light sources L1 and L2 that are outside the color adaptation range are made the initial white point and the target white point without any modification, a person's eyes will naturally over correct as it is an environment with color fogging, and may give an unnatural appearance. Therefore, by making points where lines joining the default white point Pd and light sources L1 and L2 cross the color adaptation range Q, or are within the color adaptation range Q, the initial white point position and the target white point, even for light source that appears to have a color fogging, it is possible to reproduce the color as it looks with the same color fogging.

In the example shown in FIG. 12, points where straight lines or curved lines joining the default white point Pd and light source L1 etc. cross the color adaptation range Q, or positions within the color adaptation range, were set as the initial white point (Ws) and the target white point (Wt), but this is not limiting, and a method only has to enable setting of an initial white point within the color adaptation range, for example, a point joining the color adaptation range Q and a light source with a minimum distance etc.

In this way, with this embodiment, the microcomputer 121 functions as a determination section to set a white point range corresponding to an adaptive light source range, which is a range of light source in which it is possible for a person to recognize that a white object is white, as adaptive tracking range Q, and designates that adaptive tracking range Q in advance, and determine whether or not an initial white point (Ws) and a target white point (Wt) are outside the adaptive tracking range Q, and in the event that it has been determined by this determination section, based on shooting light source information, that the initial white point or the target white point are outside the adaptive tracking range Q (S707 of FIG. 7 and S808 in FIG. 8), a new initial white point and a new target white point are set within the adaptive tracking range Q (S708 in FIG. 7, S809 in FIG. 8, FIG. 12). As a result, "white" is reproduced as "white" in a range where a person feels that "white" is "white", and in a range where a color cast is perceived the color cast is reproduced, which means that it is possible to reproduce the same color cast as that seen.

Next, a modified example 2 of the one embodiment of the present invention will be described using FIG. 13-FIG. 16. With the one embodiment of the present invention, color adaptation range Q1 or Q2 was acquired in accordance with the A flag, and after that white point was set using this color adaptation range. Conversely, with this modified example, the color adaptation range is changed over time.

The color adaptation range is changed over time for the following reason. In the case of shooting while looking at the EVF 139, composition and field of view are confirmed using the viewfinder, operations such as adjusting color cast are carried out using the viewfinder, and finally a shooting operation is entered. While this is taking place, the photographer will gradually become accustomed to the subject image in the viewfinder, and so the color adaptation range is also gradually widened. With this modified example, therefore, the color adaptation range is changed over time.

Figure 13:
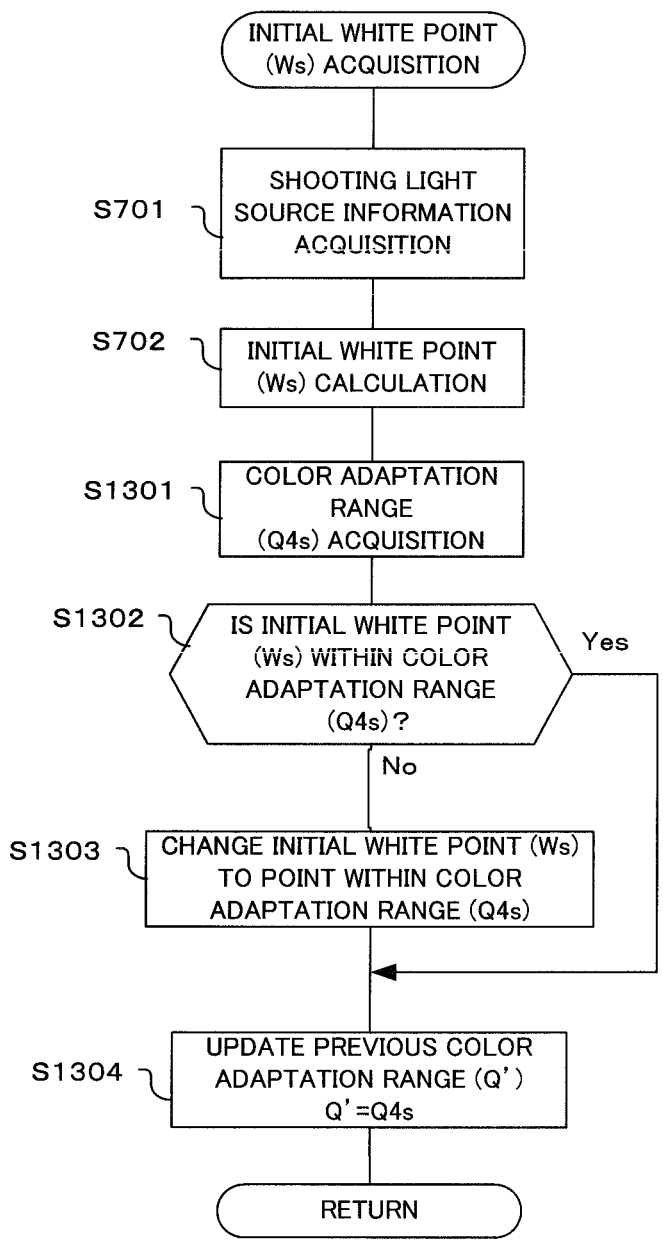
FIG. 13 is a flowchart showing operation for initial white point acquisition, in a first modified example of the camera of one embodiment of the present invention.
Figure 15:
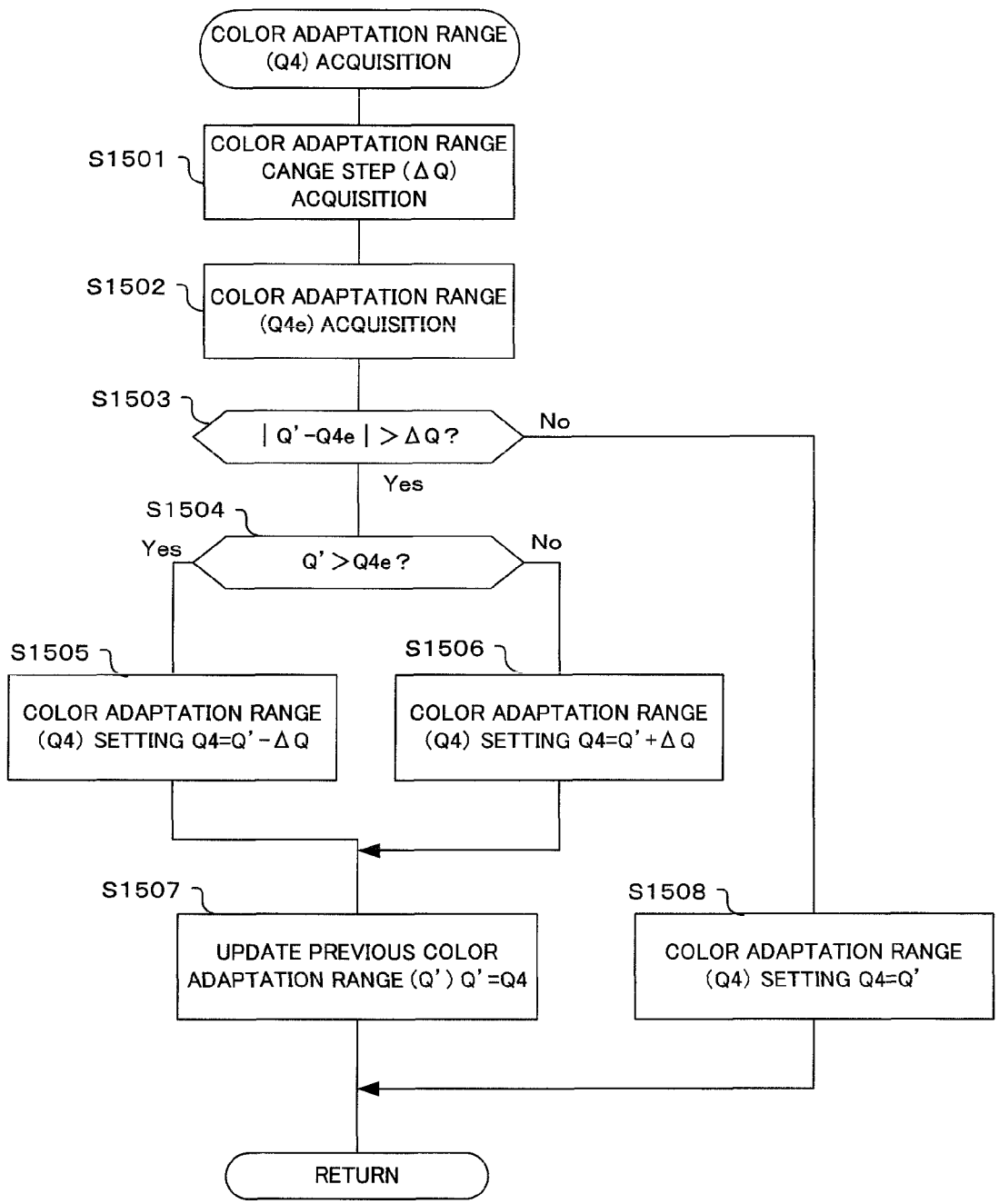
FIG. 15 is a flowchart showing operation for color adaptation range (Q4) acquisition, in a first modified example of the camera of one embodiment of the present invention.
Figure 16:
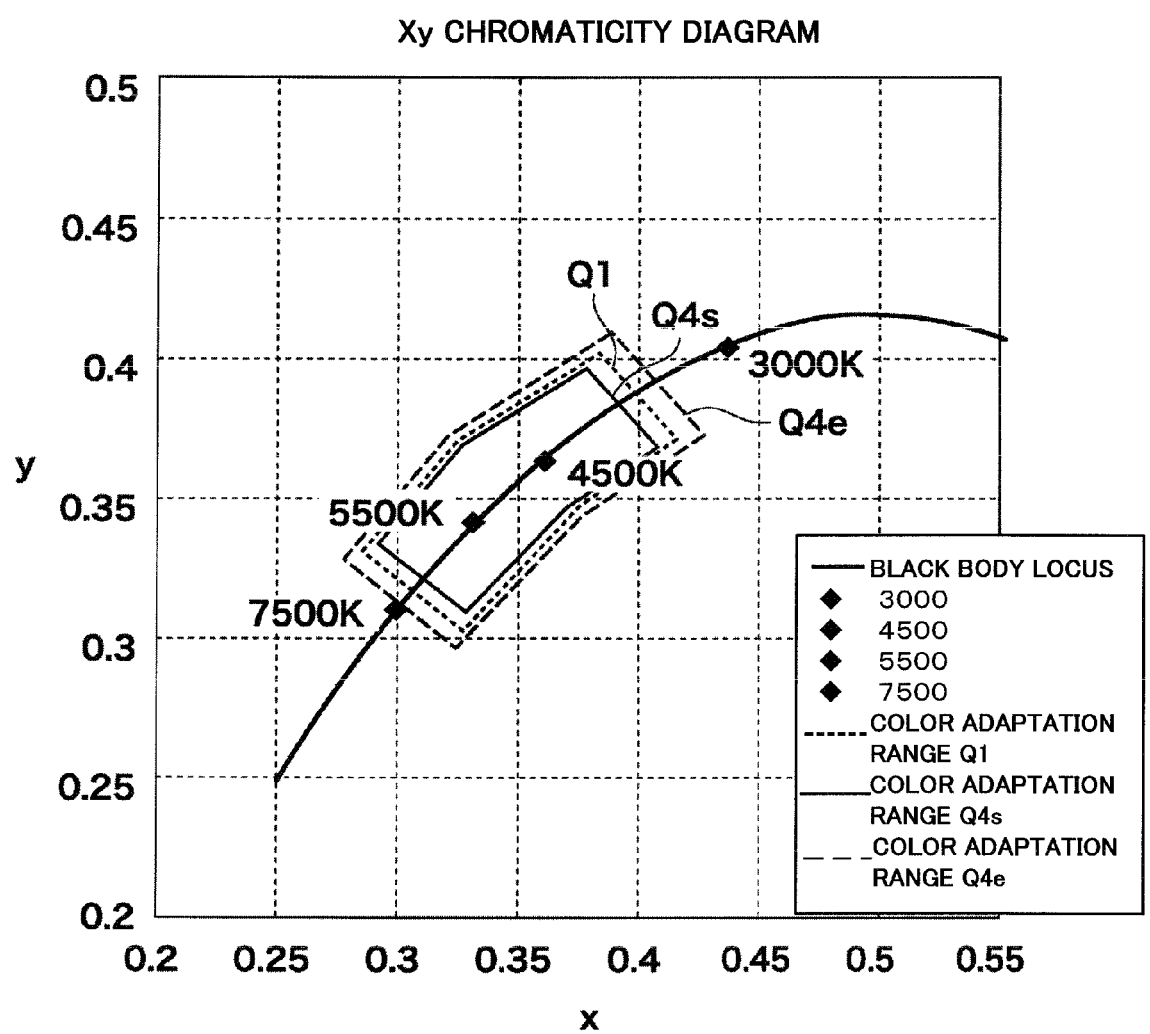
FIG. 16 is a graph showing a color adaptation range on an xy chromaticity diagram, in a first modified example of the camera of one embodiment of the present invention.
Figure 17:
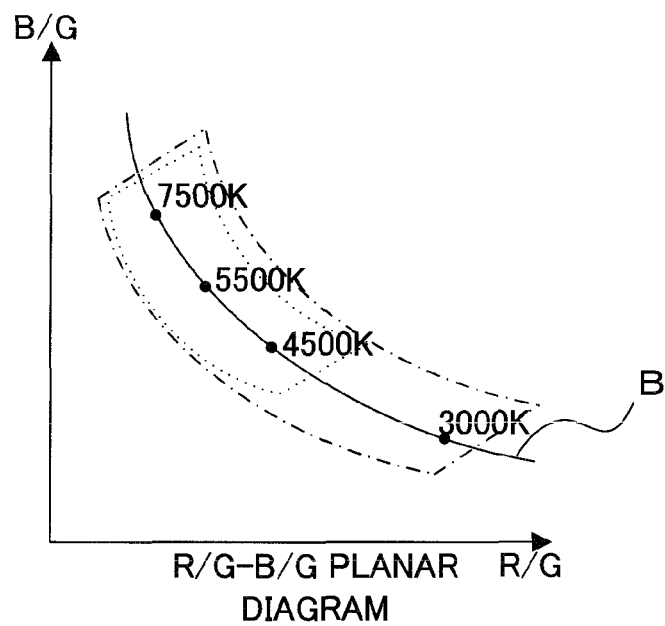
FIG. 17 is a graph showing a color temperature curve displayed using an R/G-B/G plane view, in another modified example of the camera of one embodiment of the present invention.
Figure 18:
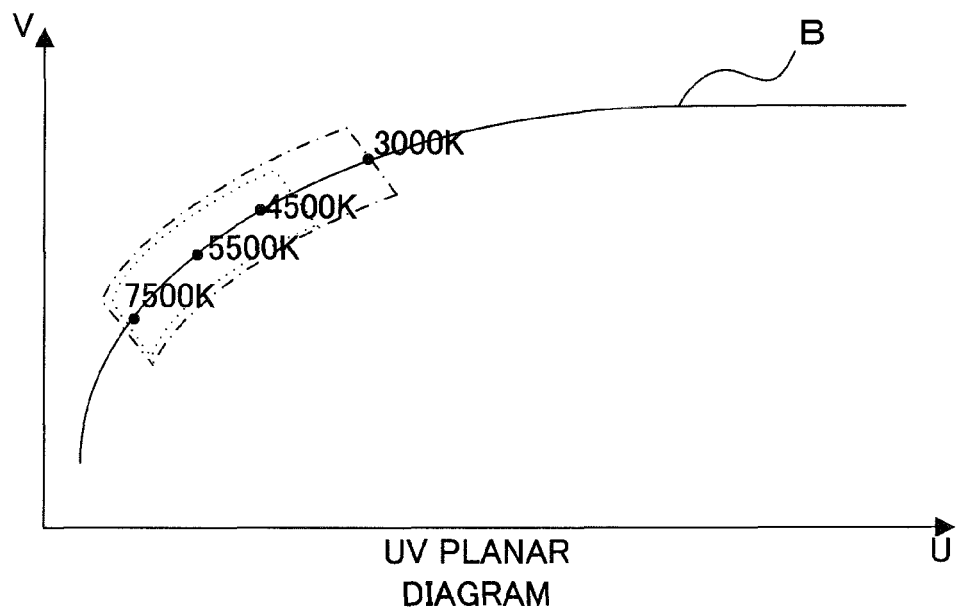
FIG. 18 is a graph showing a color temperature curve displayed using a UV plane view, in another modified example of the camera of one embodiment of the present invention.

The structure shown in FIG. 1 for the one embodiment of the present invention, and the flowchart shown in FIG. 5 and FIG. 6, also used with this modified example, and the modified example differs from the one embodiment of the present invention in that the flowcharts for acquisition of initial white point (Ws) in FIG. 7 and the white point calculation 2 of FIG. 8 are replaced with the flowcharts shown in FIG. 13 and FIG. 14 (additional description is given in FIG. 15 and FIG. 16). These points of difference will therefore be described. The operations shown in these flowcharts are executed by the microcomputer 121 in accordance with programs stored in the flash memory 125.

If the flow for initial white point (Ws) acquisition shown in FIG. 13 is entered, then similarly to S701 in FIG. 7, shooting light source information is acquired (S701), and similarly to S702 in FIG. 7, initial white point (Ws) is acquired (S702). Operation in the steps is the same as the flow in FIG. 7, and so detailed description is omitted.

Next, a color adaptation range (Q4s) is acquired (S1301). With the flow for initial white point (Ws) acquisition that was shown in FIG. 7, a predetermined color adaptation range was selected for determining the initial white point (Ws) based on flag A. Conversely, with this modified example, Q4s is acquired as a color adaptation range immediately after having looked into the viewfinder EVF 139. This color adaptation range Q4s is stored in the flash memory 125, and so this value is read out. It may be possible to appropriately change the color adaptation range Q4s in accordance with the user's preference etc.

Once the color adaptation range (Q4s) has been acquired, it is next determined whether or not the initial white point (Ws) is within the color adaptation range (Q4s) (S1302). Here, it is determined whether or not the initial white point (Ws) that was calculated in step S702 is within the color adaptation range (Q4s) that was acquired in step S1302.

If the result of determination in step S1302 is that the initial white point (Ws) is not within the color adaptation range (Q4s), the initial white point (Ws) is changed to a point within the color adaptation range (Q4s) so as to fall in the color adaptation range (S1303). This changing of the initial white point (Ws) is the same as the description for FIG. 12 above.

If the result of determination in step S1302 is that the initial white point (Ws) is within the color adaptation range (Q4s), the initial white point (Ws) is not changed and that value is used as it is.

If change of the initial white point (Ws) has been carried out in step S1303, or if the result of determination in step S707 was that the initial white point (Ws) was within the color adaptation range, update to the previous color adaptation range (Q') is carried out to give Q'=Q4s (S1304). Here, color adaptation range (Q4s) stored as the previous color adaptation range (Q'). Once update of the previous color adaptation range (Q') has been carried out, the flow for initial white point (Ws) acquisition is terminated and the originating flow is returned to.

Next, operation of the white point calculation 2 of this modified example will be described using FIG. 14. The white point calculation of this modified example differs from the flowchart shown in FIG. 8 in that steps S804-S809 are replaced with step S1401-1403 in FIG. 14, and other steps are the same. Description will therefore concentrate on points of difference.

If the flow shown in FIG. 14 is entered, it is determined whether or not t−t'>Δt (S801), and if the result of this determination is that t−t'>Δt then next shooting light source information is acquired (S802), and target white point (Wt) is acquired (S803).

If target white point (Wt) has been acquired, then next the color adaptation range (Q4) is acquired (S1401). In this modified example, the range of the color adaptation range (Q4) is changed every change interval Δt in a direction from color adaptation range (Q4s) towards color adaptation range (Q4e) (refer to FIG. 16). In this step, a changed color adaptation range (Q4) is required. Detailed operation of the color adaptation range (Q4) acquisition will be described later using FIG. 15.

If the color adaptation range (Q4) has been acquired, it is next determined whether or not the target white point (Wt) is in the color adaptation range (Q4) (S1402). Here, it is determined whether or not the target white point (Wt) that was acquired in step S803 is within the range of the color adaptation range (Q4) that was acquired in step S1401.

If the result of determination in step S1402 is that the target white point (Wt) is not within the color adaptation range (Q4), the target white point (Wt) is changed to a point within the color adaptation range (Q4) so as to fall within the color adaptation range (S1403). This change is the same as that described previously for FIG. 12. If the result of determination in step S1402 is that the target white point (Wt) is within the color adaptation range (Q4), that value is used as it is without changing the target white point (Wt).

If change of the target white point (Wt) has been carried out in step S1403, or if the result of determination in step S1402 is that the target white point (Wt) is within the color adaptation range (Q4), it is next determined whether or not |W'−Wt|>ΔW (S810). Operation in these steps S810-S815 is the same as in FIG. 8, and so detailed description is omitted.

Next, detailed operation of acquiring the color adaptation range (Q4) in step S1401 will be described using FIG. 15. If the flow of FIG. 15 is entered, first a color adaptation range change step (ΔQ) is acquired (S1501). With this modified example, the color adaptation range is changed in a stepwise manner in accordance with time spent by the user looking into the viewfinder EVF 139. In this step, a change step (ΔQ) for when changing the color adaptation range is read in. This change step (ΔQ) is pre-stored in the flash memory 125, and so this value is read out.

If the color adaptation range change step (ΔQ) has been acquired, next the color adaptation range (Q4e) is acquired (S1502). This color adaptation range (Q4e) is a final color adaptation range in the case where a sufficient time has elapsed from looking into the viewfinder EVF 139 (refer to FIG. 16). This color adaptation range (Q4e) is pre-stored in the flash memory 125, and so this value is read out.

If the color adaptation range (Q4e) has been acquired, it is next determined whether or not |Q'−Q4e|>ΔQ (S1503). Here, it is determined whether or not an absolute value of the difference between the newest color adaptation range (refer to S1304, S1507) and the final color adaptation range (4Qe) that was acquired in S1502 is larger than the change step that was acquired in step S1501.

If the result of determination in step S1503 is not that |Q'−Q4e|>ΔQ, the color adaptation range (Q4) is set to give Q4=Q' (S1508). Specifically, in this case, since a difference between the previous color adaptation range (Q4) and the final color adaptation range (Q4e) is within ΔQ, the previous color adaptation range (Q') is set to color adaptation range (Q4).

On the other hand, if the result of determination in step S1503 is that |Q'−Q4e|>ΔQ, it is next determined whether or not Q'>Q4e (S1504). With this modified example, the previous color adaptation range Q' and the final color adaptation range (Q4) are compared, and if the previous color adaptation range (Q') is large compared to the final color adaptation range (Q4e) the range is made small, while if the previous color adaptation range (Q') is small the range is made large. In this step, a magnitude relationship is determined for that purpose.

If the result of determination in step S1504 is that Q'>Q4e, the color adaptation range (Q4) is set such that Q4=Q'−ΔQ (S1505). On the other hand, if Q'>Q4e does not hold, the color adaptation range (Q4) is set such that Q4=Q'+ΔQ (S1506). If the color adaptation range (Q4) has been set, next the previous color adaptation range (Q') is updated such that Q'=Q4 (S1507).

Once the processing of step S1507 or S1508 has been carried out, the flow for color adaptation range (Q4) acquisition is completed and the originating flows turn to.

Next, the color adaptation range of this modified example will be described using FIG. 16. When the photographer initially looks into the viewfinder EVF 139 the color adaptation range is color adaptation range Q4s, and a final color adaptation range is Q4e. With this modified example, the color adaptation range Q1 is varied in units of ΔQ every change interval Δt until the final color adaptation range Q4e is reached. As a result, the color adaptation range is gradually widened as the photographer's eyes become acclimatized.

As has been described above, if the viewfinder EVF 139 is continuously looked into, the photographer's eyes become accustomed to the environment within the viewfinder EVF 139. The color adaptation range is therefore different immediately after looking into the viewfinder EVF 139, and after having looked into the viewfinder EVF 139 continuously for a while. With this modified example, the color adaptation range is also changed in accordance with time after having looked into the viewfinder EVF 139 stop. As a result, it is possible to confirm the color cast off a taken image beforehand regardless of the environment, by taking into consideration adaptability of the human eye.

In the description above, an example of the color adaptation range has been described using an xy plane, but is not absolutely necessary to be an xy plane. For example, it is possible to designate the color adaptation range using a YUV plane. Correlated color temperature in YUV space becomes linear perpendicular to the black body locus B, which means in the case of designating color adaptation range taking into consideration the correlated color temperature, the YUV method may sometimes be easier.

Also, besides the YUV plane, it is possible to use RGB which is often used as WB gain, so as to designate the color adaptation range in a R/G-B/G plane. However, in this case, since the black body locus B varies in accordance with spectral characteristics of the image sensor or transmittance of a lens, a color adaptation area must also take into consideration and reflect this fact. Various other types of color space when setting as a color adaptation range can also be considered, but an optimal color space is preferably selected.

As has been described above, with the one embodiment on the modified example of the present invention, whether or not a user's eye is close to the EVF 139 is detected by an eye sensor 141 (S502, S503), and in the case where the eye of the user has been detected by the eye sensor 141 an initial white point (Ws) or a target white point (Wt) for a display panel of the EVF 139 is calculated based on light source information of the shooting environment (S702, S803), and after commencing display on the electronic viewfinder display panel at the initial white point, control is carried out to change the white point of the display panel of the EVF 139 from the initial white point (Ws) so as to become the target white point (Wt). In this way, since control is carried out based on light source information of the shooting environment so as to achieve the white point of the display panel, it is possible to confirm color cast of a taken image beforehand regardless of the environment.

Also, with the one embodiment or the modified example of the present invention, in the event that is determined that the initial white point (for example, Ws of S702 in FIG. 7) or the target white point (for example, Wt of S803 in FIG. 8) are outside the adaptive tracking range (for example, Yes at S808 in FIG. 8), a new initial white point or a new target white point are calculated so as to be within the adaptive range (for example, S708 in FIG. 7, S809 in FIG. 8). As a result, it is possible to confirm the color cast of a taken image beforehand regardless of the environment, by taking into consideration adaptability of the human eye.

With this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), game console etc. In any event, it is possible to adopt the present invention as long as a device is provided with an EVF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, having an electronic viewfinder with which it is possible to view an image displayed on a display section through an eyepiece, comprising:
    a storage section for previously holding an initial white point of a display panel of the electronic viewfinder,
    a calculation section for calculating target white point of the display panel of the electronic viewfinder based on light source information for the shooting environment,
    an eye proximity detection section for detecting whether or not the user's eye is close to the electronic viewfinder,
    a determination section for making a white point range corresponding to an adaptive light source range, which is a light source range in which the user can recognize a white object as being white, an adaptive tracking range, and previously designating that adaptive tracking range, and determining whether or not the initial white point or the target white point are outside the adaptive tracking range, and
    a display control section for, in the event that the user's eye has been detected by the eye proximity detection section, after commencing display for the display panel of the electronic viewfinder at the initial white point, carrying out control to change the white point of the electronic viewfinder display panel from the initial white point over time, so as to become the target white point, wherein
    in the event that is has been determined by the determination section that the initial white point or the target white point is outside the adaptive tracking range, the calculation section calculates a new initial white point or a new target white point so as to be within the adaptive range.

2. The imaging device of claim 1, further comprising:
    an adaptive tracking range setting section for setting a switching flag for switching of the adaptive tracking range, wherein
    the determination section is provided with a first adaptive tracking range and a second adaptive tracking range that is different to the first tracking range, and determines switching of the first adaptive tracking range and the second adaptive tracking range based on the switching flag provided in the adaptive tracking range setting section, and
    the calculation section calculates a new initial white point or a new target white point so as to be within the first adaptive tracking range or the second tracking range.

3. The imaging device of claim 1, wherein:
    the second adaptive tracking range provided in the determination section is a wider range than the first adaptive tracking range, and includes the first adaptive tracking range.

4. The imaging device of claim 2, wherein:
    the adaptive tracking range setting section sets the adaptive tracking range in accordance with at least one of a switch operation, subject brightness, focal length, movement of a main subject, or camera movement.

5. The imaging device of claim 1, wherein:
    the storage section stores a default white point as the initial white point.

6. The imaging device of claim 1, wherein:
    the calculation section calculates a new initial white point or new target white point within a boundary of the adaptive tracking range, on a line that passes through a default white point and white point for the light source information of the shooting environment.

7. The imaging device of claim 1, further comprising:
    a timing section for timing an eye time as elapsed time from detection of the user's eye by the eye proximity detection section, and wherein
    the display control section controls change of the white point of the electronic viewfinder display panel based on a white point change variation ratio that has been designated in advance and the eye time.

8. The imaging device of claim 1, wherein:
    the calculation section calculates the new initial white point based on light source information of the shooting environment at the time of commencement of display on the display panel of the electronic viewfinder.

9. An electronic viewfinder of an imaging device with which it is possible to view an image displayed on a display section through an eyepiece, comprising:
    a storage section for previously holding an initial white point of a display panel of the electronic viewfinder,
    a calculation section for calculating target white point of the display panel of the electronic viewfinder based on light source information for the shooting environment,
    an eye proximity detection section for detecting whether or not the user's eye is close to the electronic viewfinder,
    a determination section for making a white point range corresponding to an adaptive light source range, which is light source range in which the user can recognize a white object as being white, an adaptive tracking range, and previously designating that adaptive tracking range, and determining whether or not the initial white point or the target white point are outside the adaptive tracking range, and a display control section for, in the event that it has been detected by the eye proximity detection section that the user's eye is close, after commencing display for the display panel of the electronic viewfinder at the initial white point, carrying out control to change the white point of the electronic viewfinder display panel from the initial white point over time, so as to become the target white point, wherein in the event that is has been determined by the determination section that the initial white point or the target white point is outside the adaptive tracking range, the calculation section calculates a new initial white point or a new target white point so as to be within the adaptive range.

10. A display control method, for an imaging device having an electronic viewfinder with which it is possible to view an image displayed on a display section through an eyepiece, and a storage section for previously holding an initial white point of a display panel of the electronic viewfinder, comprising:

a calculation step of calculating target white point of the display panel of the electronic viewfinder based on light source information for the shooting environment, a detection step of detecting whether or not the user's eye is close to the electronic viewfinder, a determination step of making a white point range corresponding to an adaptive light source range, which is a light source range in which the user can recognize a white object as being white, an adaptive tracking range, and previously designating that adaptive tracking range, and determining whether or not the initial white point or the target white point are outside the adaptive tracking range, and a display control step for, in the event that it has been detected in the eye proximity detection step that the user's eye is close, after commencing display for the display panel of the electronic viewfinder at the initial white point, carrying out control to change the white point of the electronic viewfinder display panel from the initial white point overtime, so as to become the target white point, wherein in the event that is has been determined in the determination step that the initial white point or the target white point is outside the adaptive tracking range, the calculation step calculates a new initial white point or a new target white point so as to be within the adaptive range.

11. A non-transitory computer-readable medium, storing a computer program, to be executed by a computer of an imaging device having an electronic viewfinder with which it is possible to view an image displayed on a display section through an eyepiece, and a storage section for previously holding an initial white point of a display panel of the electronic viewfinder, the program comprising:

a calculation step of calculating target white point of the display panel of the electronic viewfinder based on light source information for the shooting environment, a detection step of detecting whether or not the user's eye is close to the electronic viewfinder, a determination step of making a white point range corresponding to an adaptive light source range, which is light source range in which the user can recognize a white object as being white, an adaptive tracking range, and previously designating that adaptive tracking range, and determining whether or not the initial white point or the target white point are outside the adaptive tracking range, and a display control step for, in the event that it has been detected in the eye proximity detection step that the user's eye is close, after commencing display for the display panel of the electronic viewfinder at the initial white point, carrying out control to change the white point of the electronic viewfinder display panel from the initial white point overtime, so as to become the target white point, wherein, in the event that is has been determined in the determination step that the initial white point or the target white point is outside the adaptive tracking range, the calculation step calculates a new initial white point or a new target white point so as to be within the adaptive range.

\* \* \* \* \*